US010503730B1

(12) United States Patent
Speers et al.

(10) Patent No.: US 10,503,730 B1
(45) Date of Patent: Dec. 10, 2019

(54) SYSTEMS AND METHODS FOR CRYPTOGRAPHICALLY-SECURE QUERIES USING FILTERS GENERATED BY MULTIPLE PARTIES

(71) Applicant: Ionic Security Inc., Atlanta, GA (US)

(72) Inventors: Ryan Mark Speers, Silver Spring, MD (US); Adam Ghetti, Atlanta, GA (US); Brian Michael Vohaska, Silver Spring, MD (US); Jeremy Michael Eckman, Annapolis, MD (US); Katrina Jean Ray, Odenton, MD (US); Jonathan Thomas Burns, Annapolis, MD (US)

(73) Assignee: Ionic Security Inc., Atlanta, GA (US)

( * ) Notice: Subject to any disclaimer, the term of this patent is extended or adjusted under 35 U.S.C. 154(b) by 0 days.

(21) Appl. No.: 15/392,561

(22) Filed: Dec. 28, 2016

Related U.S. Application Data

(60) Provisional application No. 62/271,830, filed on Dec. 28, 2015.

(51) Int. Cl.
*G06F 16/242* (2019.01)
*G06F 21/60* (2013.01)
*G06F 16/23* (2019.01)

(52) U.S. Cl.
CPC ...... *G06F 16/2425* (2019.01); *G06F 16/2365* (2019.01); *G06F 21/602* (2013.01)

(58) Field of Classification Search
CPC ......... G06F 17/30395; G06F 17/30371; G06F 21/602; G06F 16/2425; G06F 16/2365
See application file for complete search history.

(56) References Cited

U.S. PATENT DOCUMENTS

| 5,915,025 | A | 6/1999 | Taguchi et al. |
|---|---|---|---|
| 5,963,646 | A | 10/1999 | Fielder et al. |
| 6,026,165 | A | 2/2000 | Marino et al. |
| 6,565,609 | B1 | 5/2003 | Sorge et al. |
| 6,904,521 | B1 | 6/2005 | Jivsov |
| 7,548,908 | B2 | 6/2009 | Fu et al. |
| 7,558,970 | B2 | 7/2009 | Bellovin et al. |
| 7,620,781 | B2 | 11/2009 | Breternitz, Jr. et al. |
| 7,636,439 | B2 | 12/2009 | Nakabayashi et al. |

(Continued)

FOREIGN PATENT DOCUMENTS

| EP | 2901359 A1 | 8/2015 |
|---|---|---|
| WO | 2012103093 A1 | 8/2012 |

OTHER PUBLICATIONS

Zittrower, Encrypted Phrase Searching in the Cloud, 2012, pp. 764-770.*

(Continued)

*Primary Examiner* — Albert M Phillips, III
(74) *Attorney, Agent, or Firm* — Morris, Manning & Martin, LLP; Daniel E. Sineway, Esq.; Richard L. Strasburger, Jr., Esq.

(57) ABSTRACT

Systems and methods that permit the querying of encrypted data in a cryptographically-secure manner. Generally, data that has been encrypted cannot be queried using plaintext terms because it is in ciphertext. Accordingly, use of filters that correspond to the encrypted data and are generated by multiple parties permits querying of the data without decrypting the data or compromising the security of the encrypted data or of the queries against that data.

14 Claims, 15 Drawing Sheets

OVERVIEW

(56) References Cited

U.S. PATENT DOCUMENTS

| | | | |
|---|---|---|---|
| 7,930,547 B2 | 4/2011 | Hao et al. | |
| 7,937,428 B2 | 5/2011 | Beyer et al. | |
| 8,032,529 B2 | 10/2011 | Gupta et al. | |
| 8,209,368 B2 | 6/2012 | Beyer et al. | |
| 8,261,069 B2 | 9/2012 | Bellovin et al. | |
| 8,291,509 B2 | 10/2012 | Kerschbaum et al. | |
| 8,296,274 B2 | 10/2012 | Leppard et al. | |
| 8,396,873 B2 | 3/2013 | Xie | |
| 8,495,709 B1 | 7/2013 | Cooper et al. | |
| 8,510,571 B1 | 8/2013 | Chang et al. | |
| 8,526,603 B2 | 9/2013 | Kerschbaum | |
| 8,533,489 B2 | 9/2013 | Roeder et al. | |
| 8,572,385 B2 | 10/2013 | Papamanthou et al. | |
| 8,584,232 B2 | 11/2013 | Kerschbaum | |
| 8,621,036 B1 | 12/2013 | L'Heureux et al. | |
| 8,706,884 B2 | 4/2014 | Ruellan et al. | |
| 8,726,034 B2 | 5/2014 | Papamanthou et al. | |
| 8,756,238 B2 | 6/2014 | Xie | |
| 8,811,620 B2 | 8/2014 | Chaves et al. | |
| 8,832,427 B2 | 9/2014 | Roeder et al. | |
| 8,904,176 B2 | 12/2014 | Karp et al. | |
| 8,930,691 B2 | 1/2015 | Kamara et al. | |
| 8,978,155 B2 | 3/2015 | Tamassia et al. | |
| 9,037,860 B1 | 5/2015 | Kerschbaum et al. | |
| 9,058,495 B2 | 6/2015 | Brannon et al. | |
| 9,064,229 B2 | 6/2015 | Chaves et al. | |
| 9,098,725 B2 | 8/2015 | Papamanthou et al. | |
| 9,143,449 B2 | 9/2015 | Valenza et al. | |
| 9,152,716 B1 | 10/2015 | Triandopoulos et al. | |
| 9,171,153 B2 | 10/2015 | Jorgensen | |
| 9,201,949 B2 | 12/2015 | Xie | |
| 9,213,764 B2 | 12/2015 | Kerschbaum et al. | |
| 9,224,000 B1 | 12/2015 | Ghetti | |
| 9,367,574 B2 | 6/2016 | Gupta | |
| 9,384,126 B1 | 7/2016 | Sprouse et al. | |
| 2002/0031225 A1 | 3/2002 | Hines | |
| 2004/0073617 A1 | 4/2004 | Milliken et al. | |
| 2004/0098348 A1 | 5/2004 | Kawasaki et al. | |
| 2004/0101141 A1 | 5/2004 | Alve | |
| 2004/0151323 A1 | 8/2004 | Olkin et al. | |
| 2005/0071280 A1 | 3/2005 | Irwin et al. | |
| 2006/0010324 A1 | 1/2006 | Appenzeller et al. | |
| 2007/0174613 A1 | 7/2007 | Paddon et al. | |
| 2007/0219915 A1 | 9/2007 | Hatano et al. | |
| 2007/0271459 A1 | 11/2007 | Gomez | |
| 2008/0046718 A1 | 2/2008 | Grab et al. | |
| 2008/0077806 A1 | 3/2008 | Cui et al. | |
| 2008/0130902 A1 | 6/2008 | Foo Kune et al. | |
| 2009/0296926 A1 | 12/2009 | Perlman | |
| 2009/0300168 A1 | 12/2009 | Guo et al. | |
| 2009/0319799 A1 | 12/2009 | Carpenter et al. | |
| 2010/0042838 A1 | 2/2010 | Ho | |
| 2010/0095127 A1 | 4/2010 | Banerjee et al. | |
| 2010/0106980 A1 | 4/2010 | Kerschbaum et al. | |
| 2010/0005509 A1 | 6/2010 | Peckover | |
| 2011/0093210 A1 | 4/2011 | Matsuzaki et al. | |
| 2011/0145571 A1 | 6/2011 | Schmidt-Karaca et al. | |
| 2012/0185612 A1 | 7/2012 | Zhang et al. | |
| 2012/0300923 A1 | 11/2012 | Arakawa et al. | |
| 2013/0024688 A1 | 1/2013 | Wen et al. | |
| 2013/0042108 A1* | 2/2013 | Cancedda | H04L 9/28 713/168 |
| 2013/0097421 A1 | 4/2013 | Lim | |
| 2013/0298202 A1 | 11/2013 | Warshavsky et al. | |
| 2014/0025786 A1 | 1/2014 | Gage | |
| 2014/0108435 A1* | 4/2014 | Kolesnikov | G06F 7/24 707/754 |
| 2014/0122476 A1* | 5/2014 | Kaliski, Jr. | G06F 21/6227 707/736 |
| 2014/0215590 A1 | 7/2014 | Brand | |
| 2014/0337930 A1 | 11/2014 | Hoyos et al. | |
| 2015/0039885 A1 | 2/2015 | Cash et al. | |
| 2015/0039903 A1 | 2/2015 | Cash et al. | |
| 2015/0101012 A1 | 4/2015 | White et al. | |
| 2015/0156011 A1 | 6/2015 | Kamara et al. | |
| 2015/0163309 A1 | 6/2015 | Arnoud et al. | |
| 2015/0200958 A1 | 7/2015 | Muppidi et al. | |
| 2016/0140179 A1 | 5/2016 | Yuen | |

OTHER PUBLICATIONS

Raykova, Secure Anonymous Database Search, 2009, pp. 115-126.*

Weaver, Satisfiability-based Set Membership Filters, Journal on Satisfiability, Boolean Modeling and Computation 8, pp. 129-148 Jan. (Year: 2014).*

Constantino, et al., "Towards Enforcing On-The-Fly Policies in BYOD Environments", Information Assurance and Security (IAS), 2013 9th International Conference, IEEE, 2013, pp. 61-65.

Cash, et al., Dynamic Searchable Encryption in very-large Databases: Data Structures and Implementation, Proceedings of the 21st Network and Distributed System Security Symposium, NDSS, 2014, 16 pages.

Cash, et al., Highly-Scalable Searchable Symmetric Encryption with Support for Boolean Queries, Proceedings of the 33rd Cryptology Conference, CRYPTO, 2013, 45 pages.

Chaum, Blind Signatures for Untraceable Payments, Advances in Cryptology Proceedings of Crypto, 1983, 6 pages.

Goh, Secure Indexes, Technical Report 216, IACR Cryptology ePrint Archive, 2003, 18 pages.

Hahn, et al., Searchable Encryption with Secure and Efficient Updates, Proceedings of the 2014 ACM SIGSAC Conference on Computer and Communications Security, ACM, 2014, 11 pages.

Icart, et al., How to Hash into Elliptic Curves, 5677 Lecture Notes in Computer Science (Advances in Cryptology—CRYPTO 2009) 303, 2009, 14 pages.

Kamara, et al., Dynamic Searchable Symmetric Encryption, Proceedings of the 19th ACM Conference on Computer and Communications Security, CCS, 2012, 24 pages.

Kamara, Parallel and Dynamic Searchable Symmetric Encryption, Proceedings of the 17th International Conference on Financial Cryptography and Data Security, FC, 2013, 15 pages.

Naveed, et al., Dynamic Searchable Encryption via Blind Storage, Proceedings of the 35th IEEE Symposium on Security and Privacy, S&P, 2014, 16 pages.

Afton Geil, Quotient Filters: Approximate Membership Queries on the GPU, University of California, GTC 2016.

Bin Fan, et al., Cuckoo Filter: Practically Better Than Bloom, Dec. 2014.

Bonomi, Beyond Bloom Filters: From Approximate Membership Checks to Approximate State Machines, SIGCOMM, 2006.

Guanrong Chen, Approximate Kalman Filtering, Series in Approximations and Decompositions—vol. 2, World Scientific, Singapore, 1993.

Lovett, et al., A Lower Bound for Dynamic Approximate Membership Data Structures, Electronic Colloquium on Computational Complexity, Report No. 87, May 17, 2010.

Pandey, A General-Purpose Counting Filer: Making Every Bit Count, 2017.

Szabo-Wexler, Approximate Membership of Sets: A Survey, Carnegie Mellon University, 2016.

Vahideh Akhlaghi, et al., Resistive Bloom Filters: From Approximate Membership to Approximate Computing with Bounded Errors, 2016.

Stanislaw Jarecki, et al., "Round-Optimal Password-Protected Secret Sharing and T-PAKE in the Password-Only model", pp. 1-44.

Pierre Baldi, et al., "Countering GATTACA: Efficient and Secure Testing of Fully-Sequenced Human Genomes", CCS'11, Oct. 17-21, 2011, pp. 691-702.

* cited by examiner

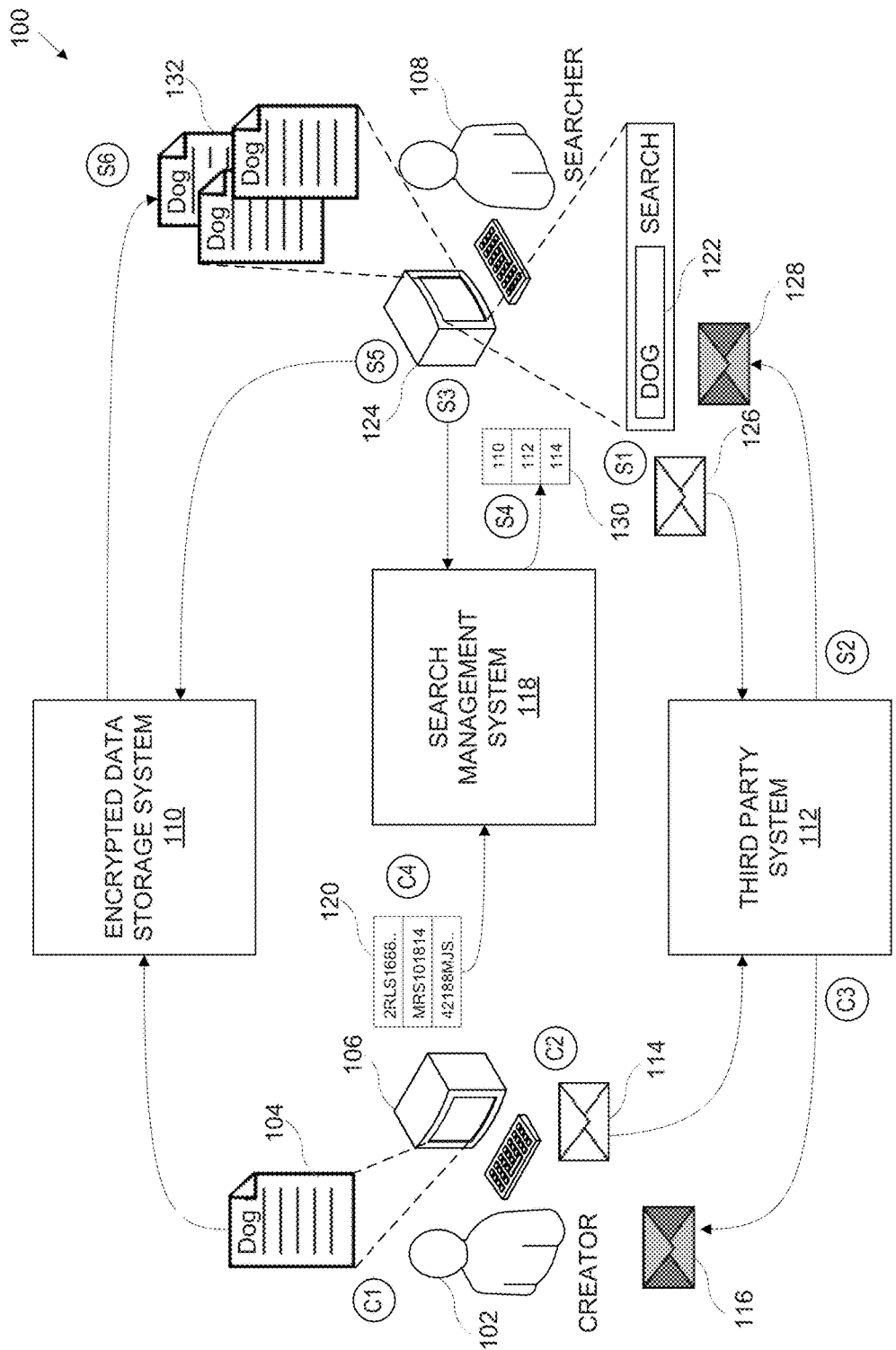
FIG 1: OVERVIEW

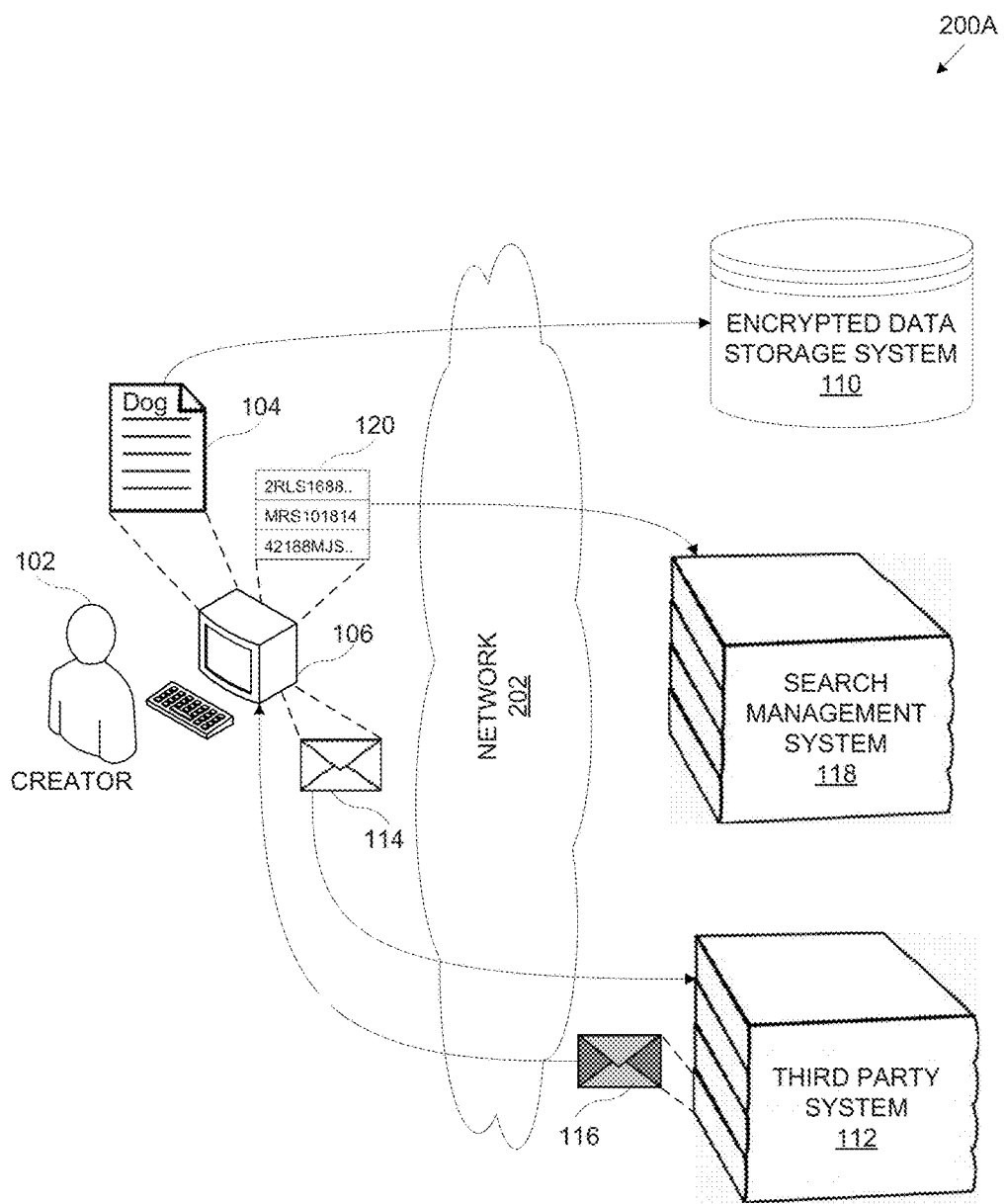
FIG 2A: EXEMPLARY SYSTEM ARCHITECTURE, SECURE-FILTER GENERATION

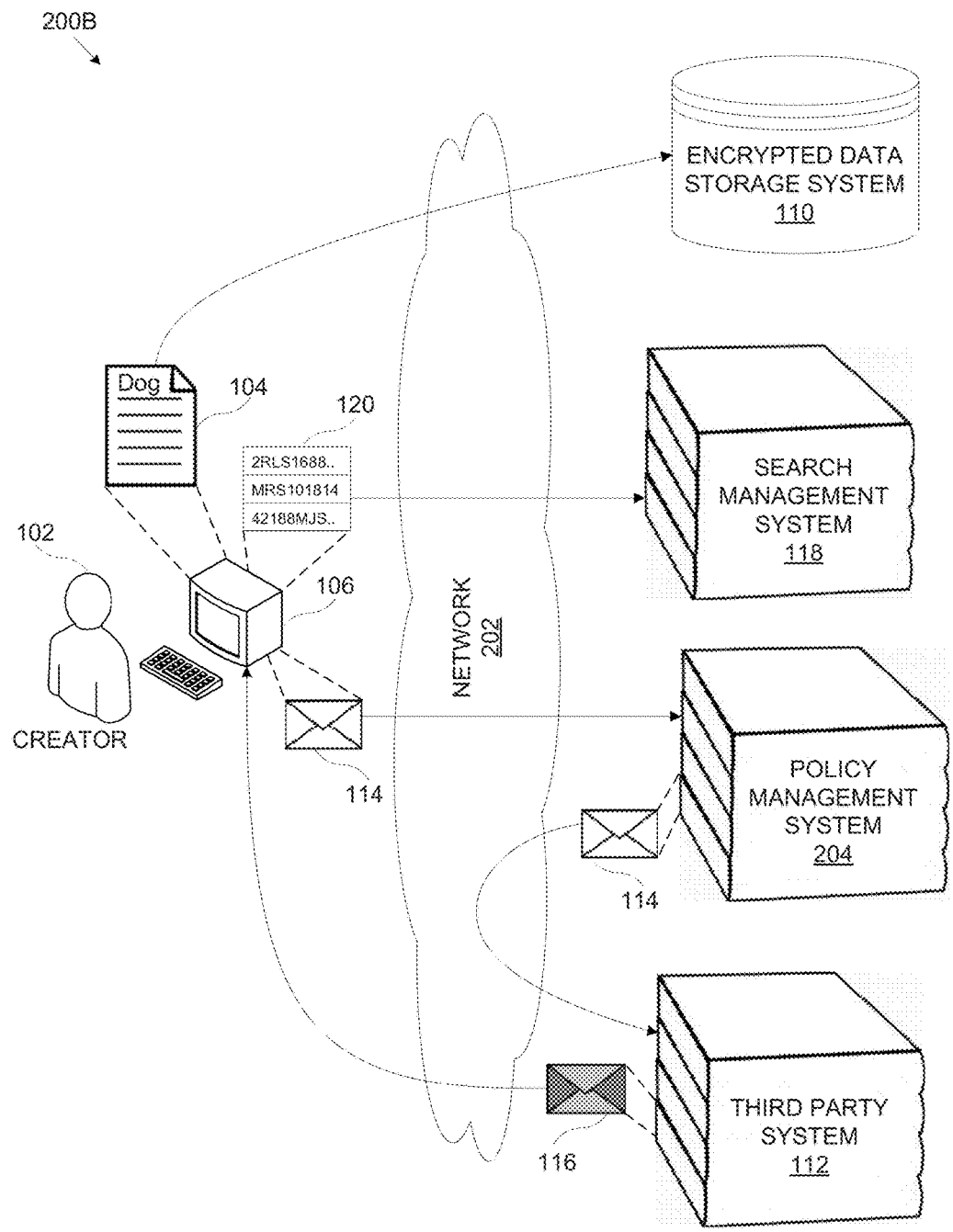
FIG 2B: EXEMPLARY SYSTEM ARCHITECTURE, ALTERNATIVE SECURE-FILTER GENERATION

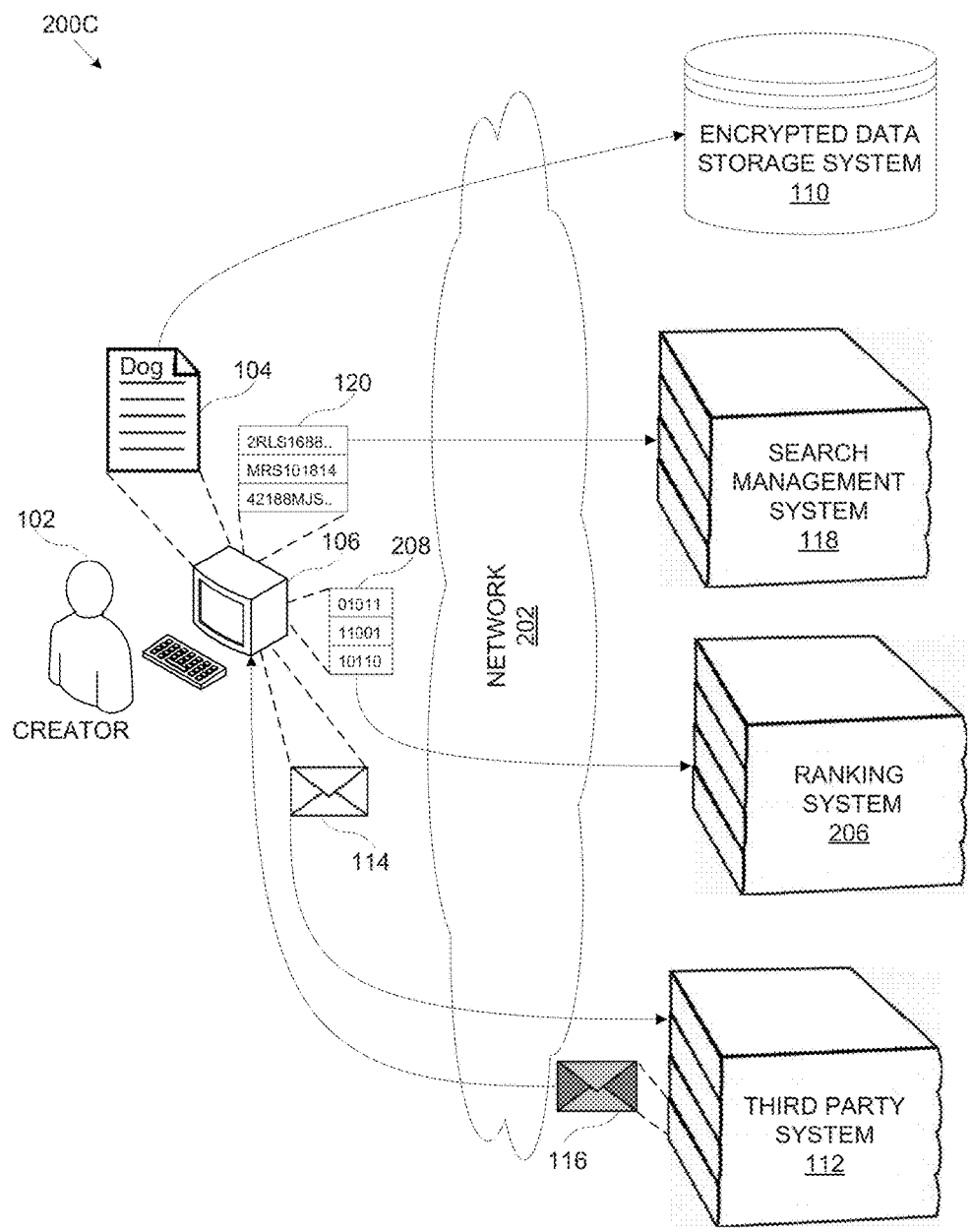
FIG 2C: EXEMPLARY SYSTEM ARCHITECTURE, ALTERNATIVE SECURE-FILTER GENERATION WITH RANKED INDEXES

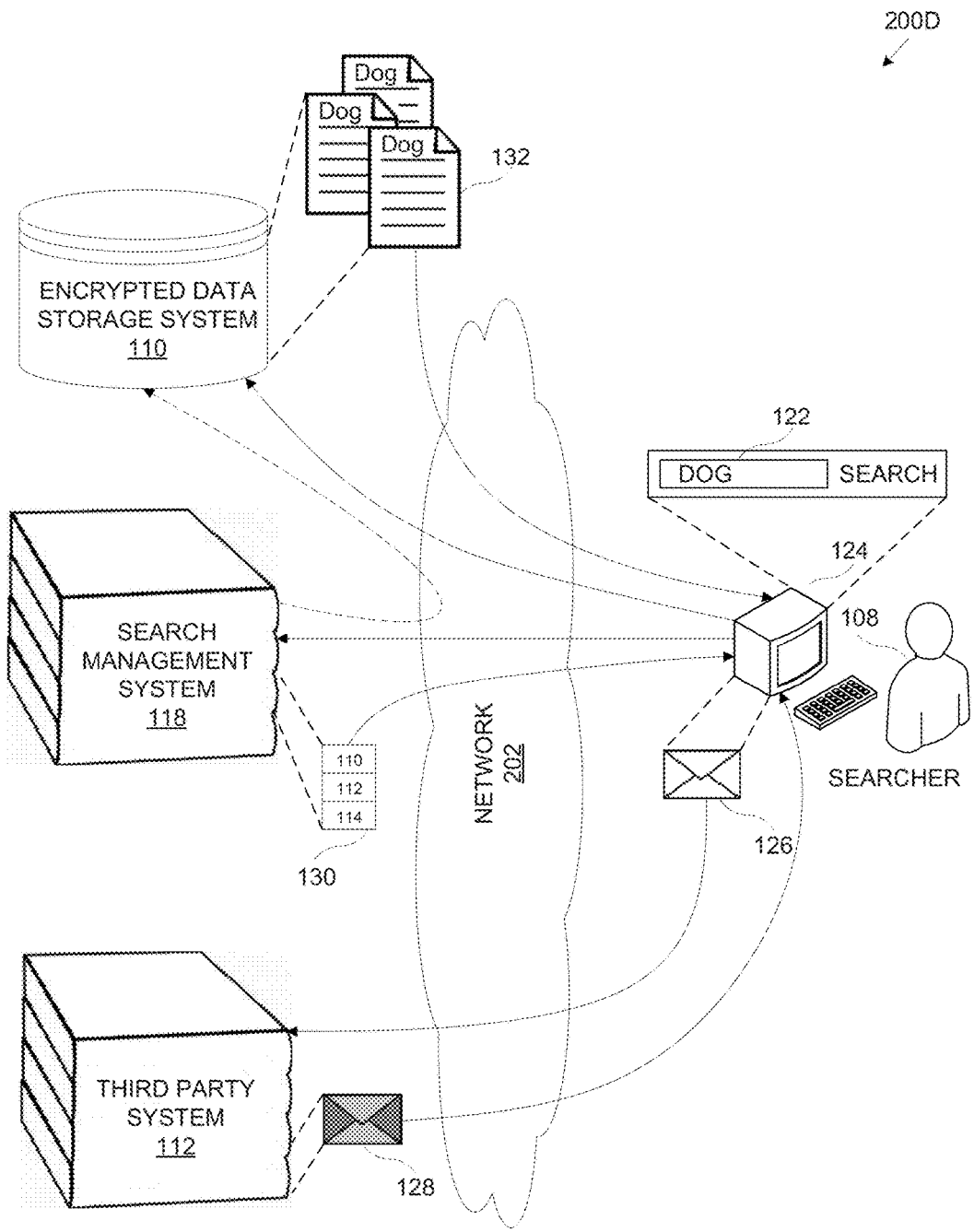
FIG 2D: EXEMPLARY SYSTEM ARCHITECTURE, CRYPTOGRAPHICALLY-SECURE QUERY

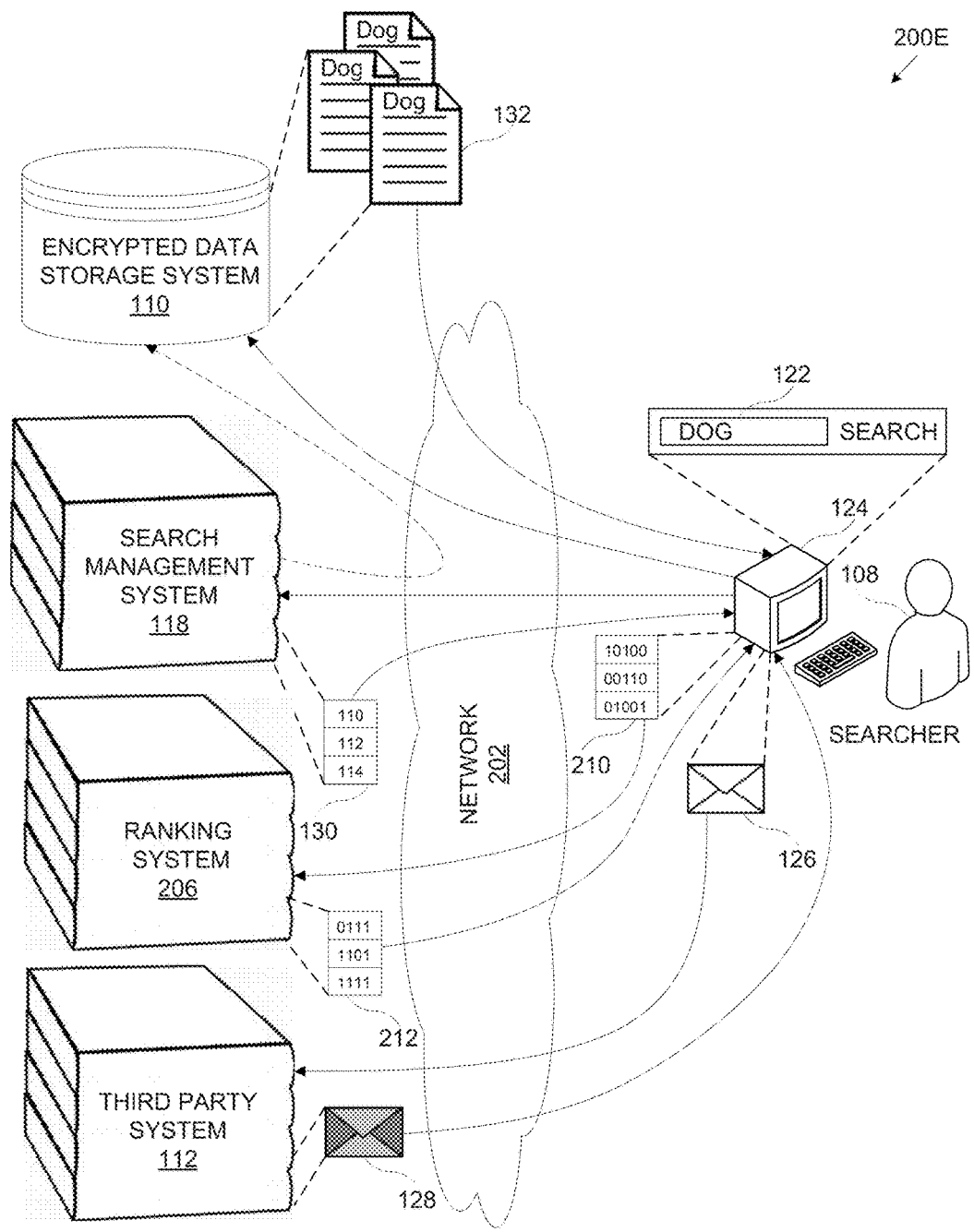
FIG 2E: EXEMPLARY SYSTEM ARCHITECTURE, ALTERNATIVE CRYPTOGRAPHICALLY-SECURE QUERY WITH RANKED INDEXES

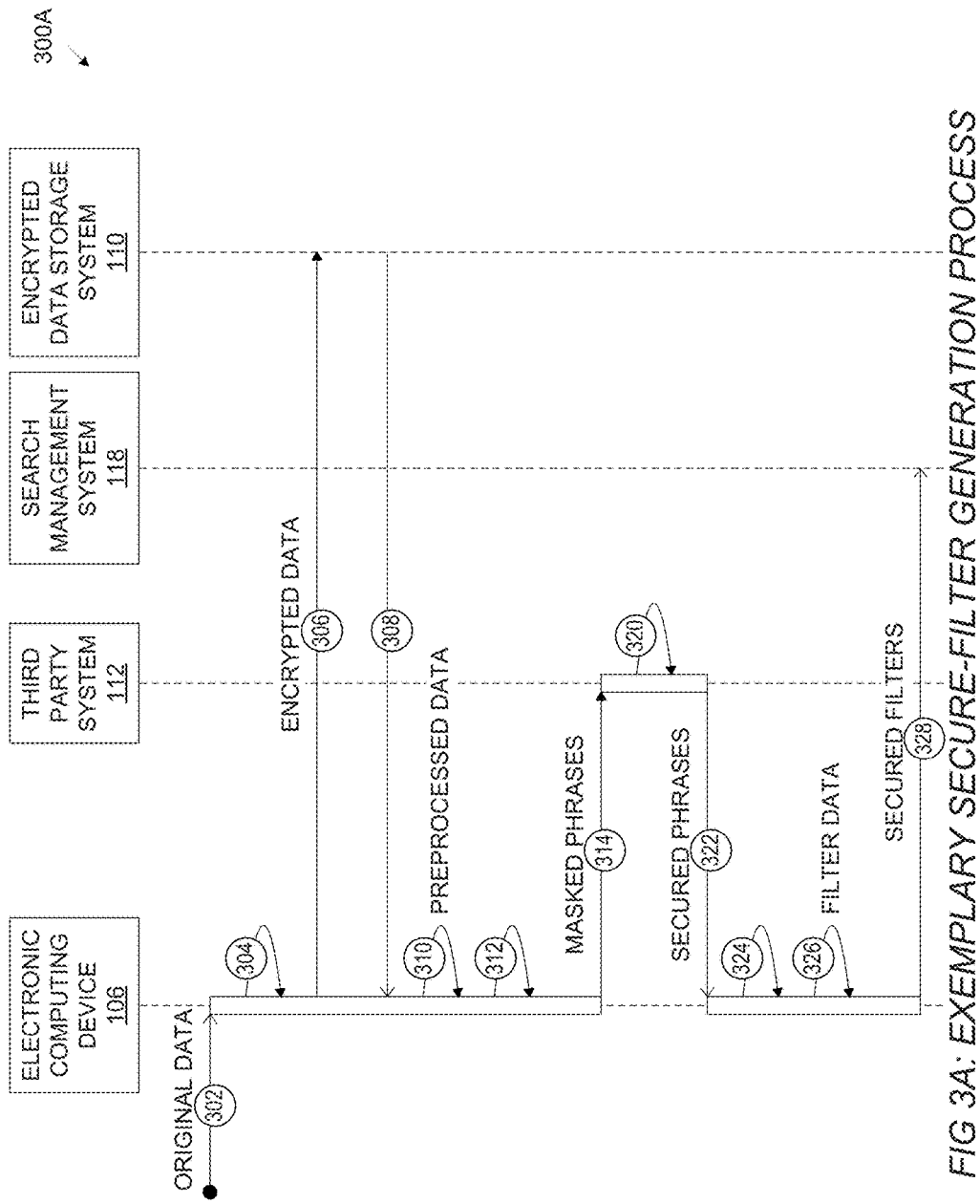

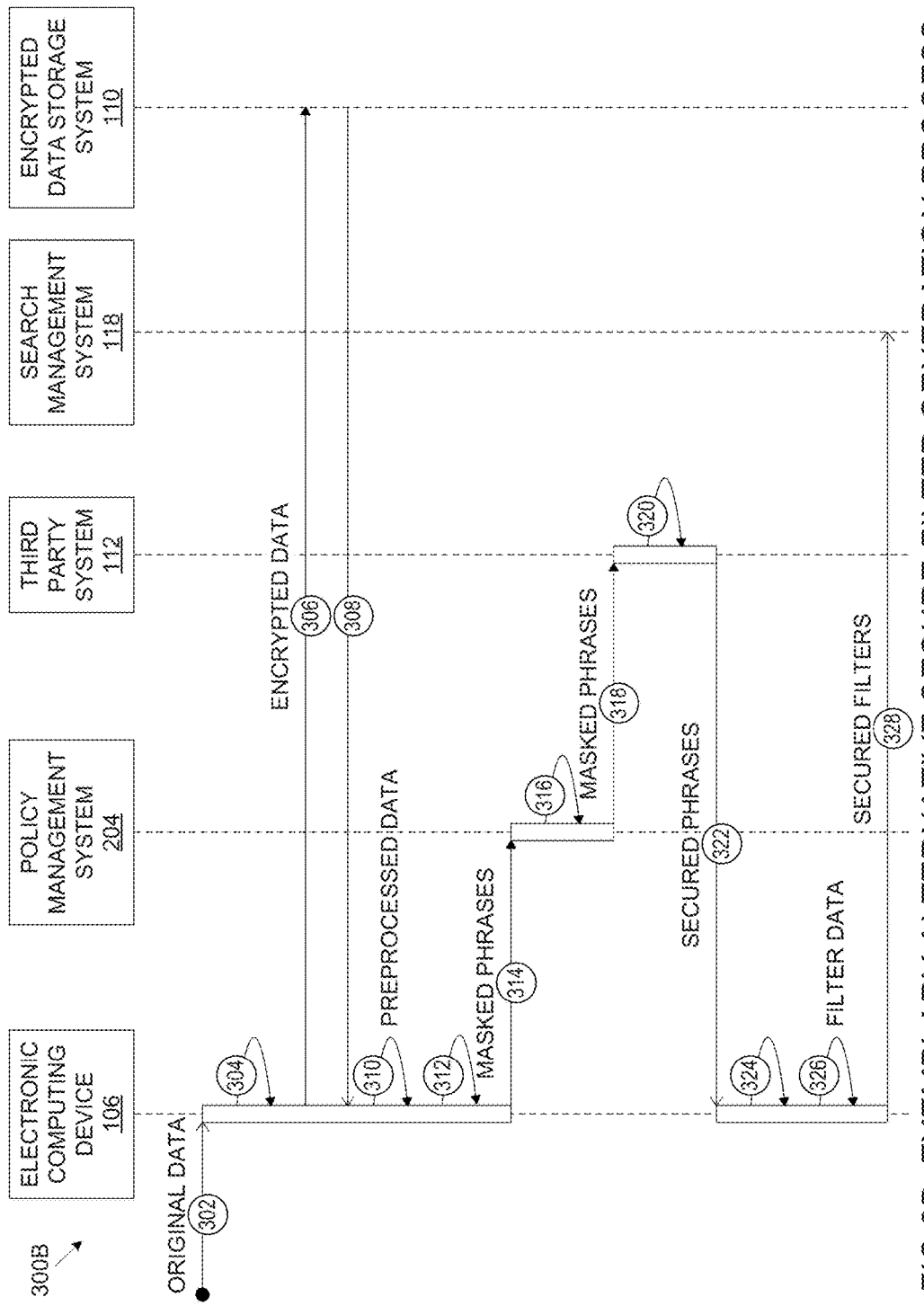

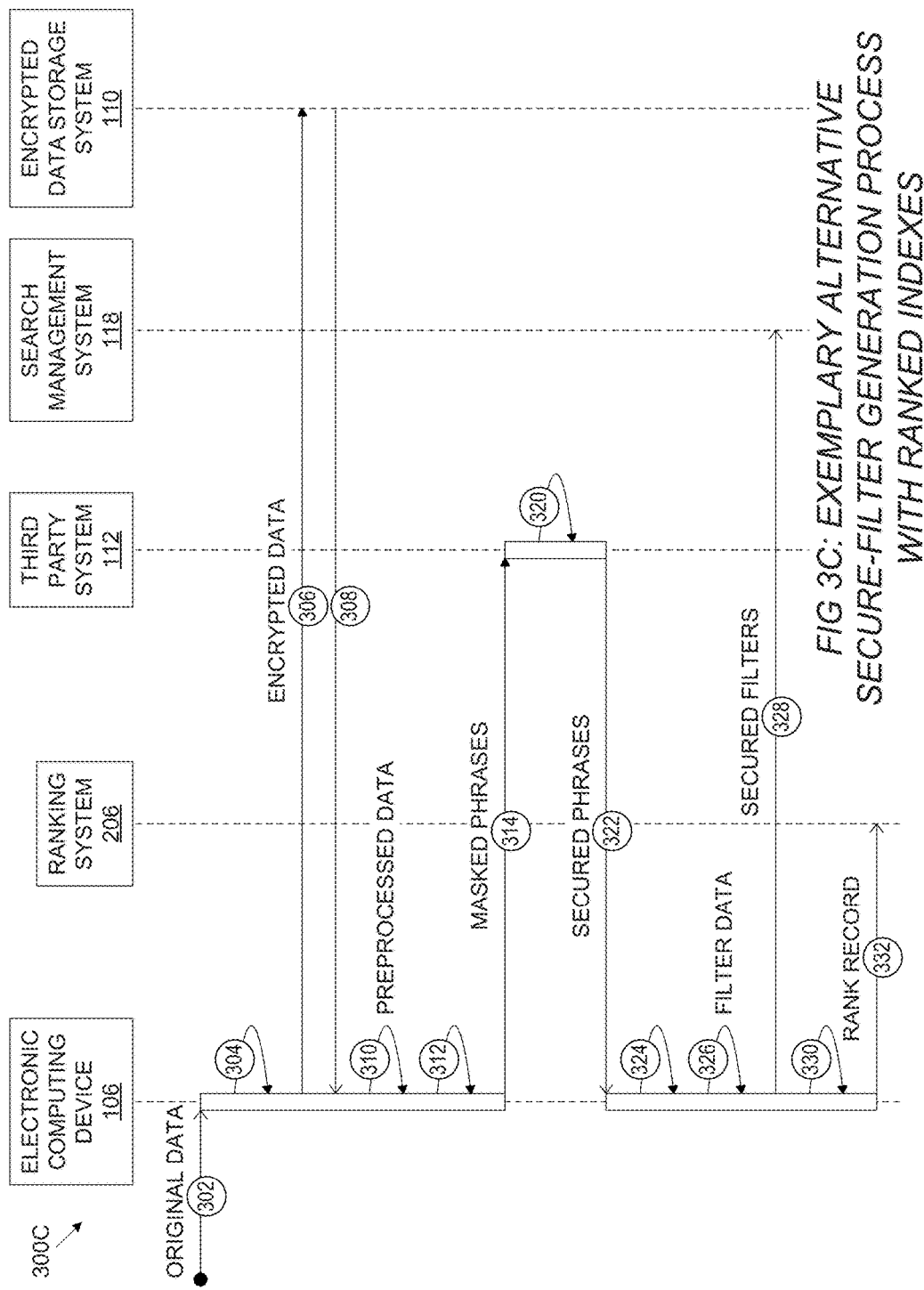

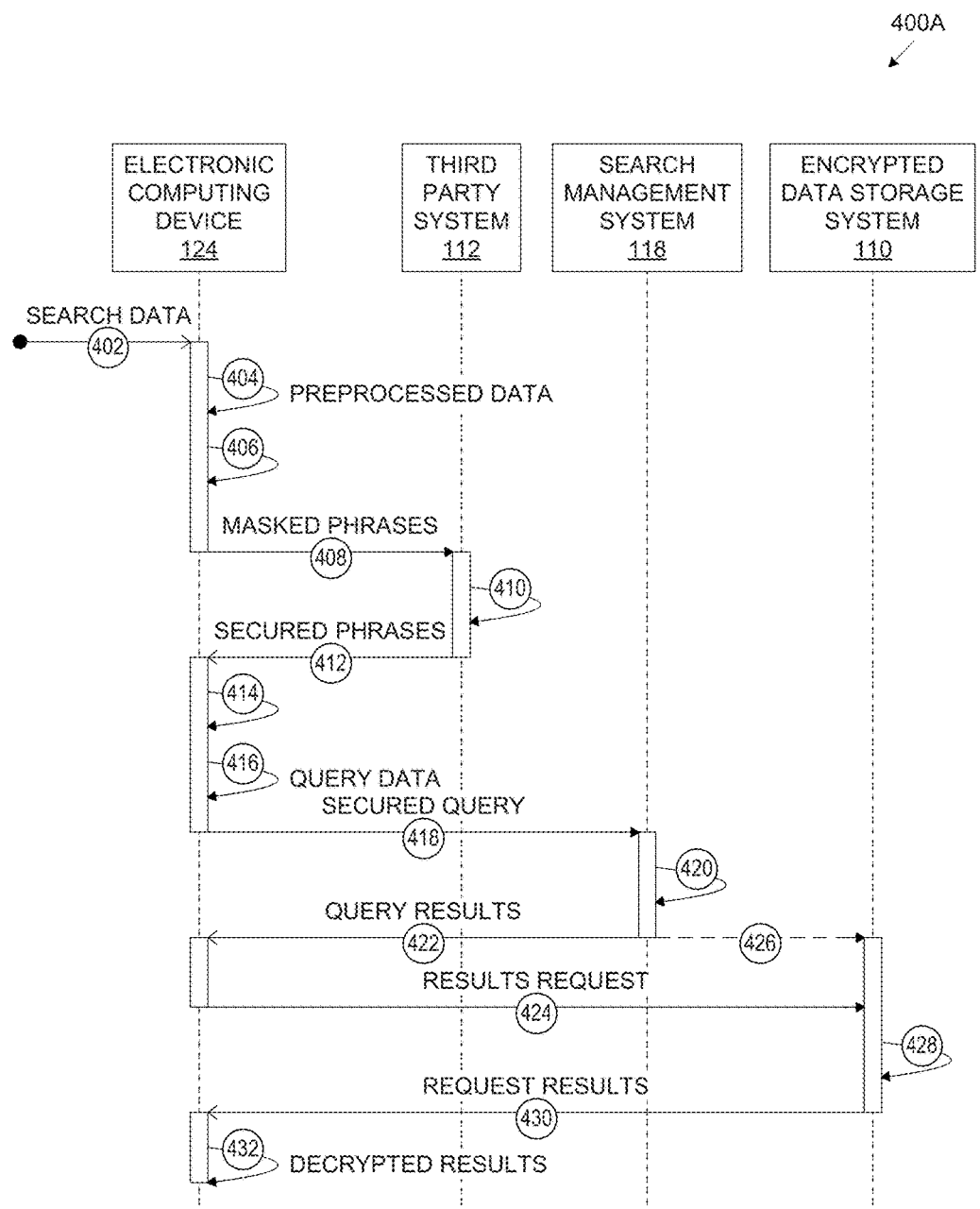
FIG 4A: EXEMPLARY CRYPTOGRAPHICALLY-SECURE QUERY PROCESS

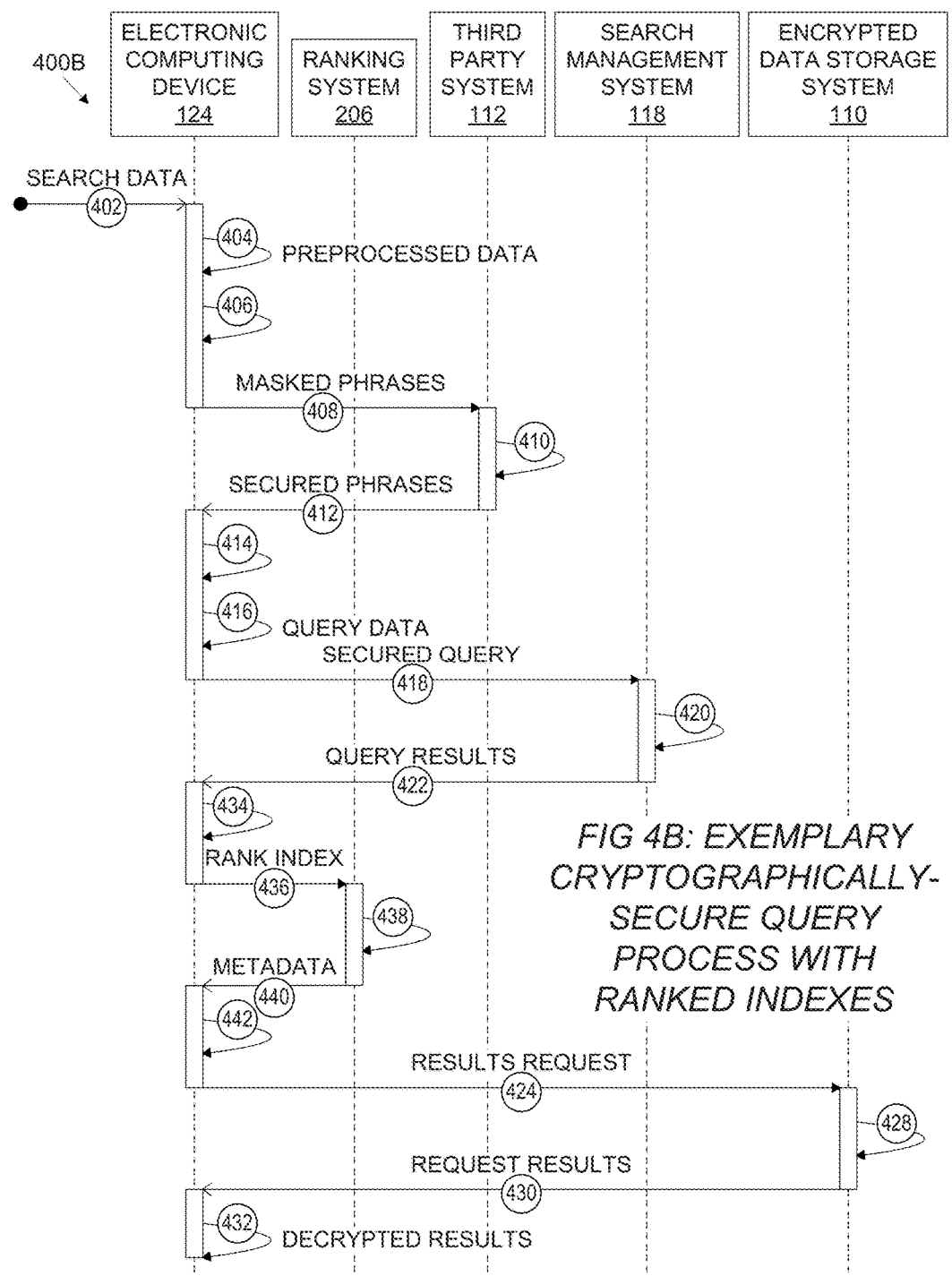
FIG 4B: EXEMPLARY CRYPTOGRAPHICALLY-SECURE QUERY PROCESS WITH RANKED INDEXES

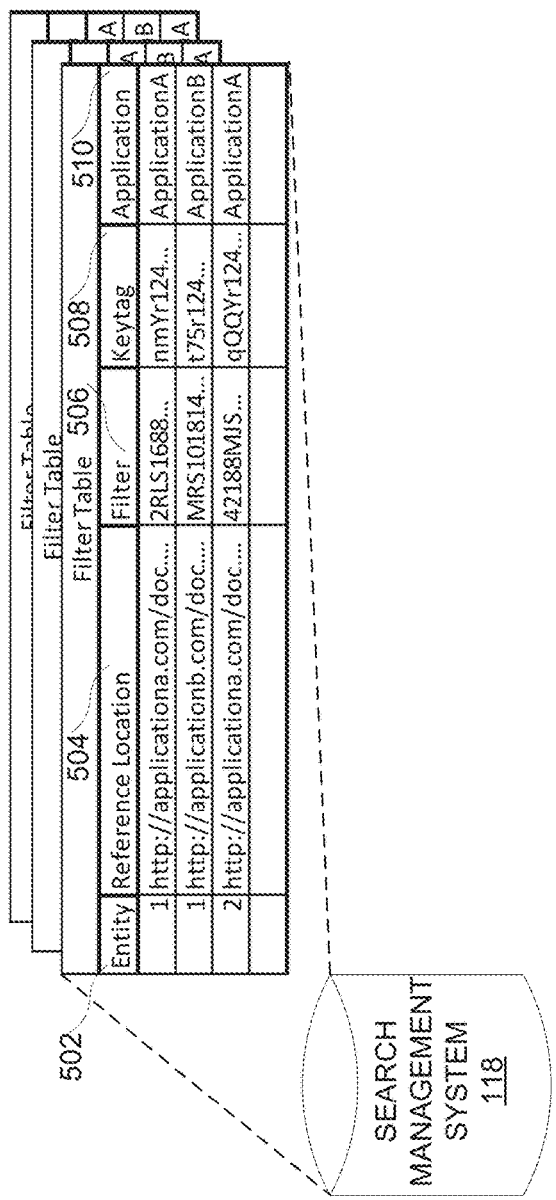
FIG. 5A: EXEMPLARY FILTER TABLE

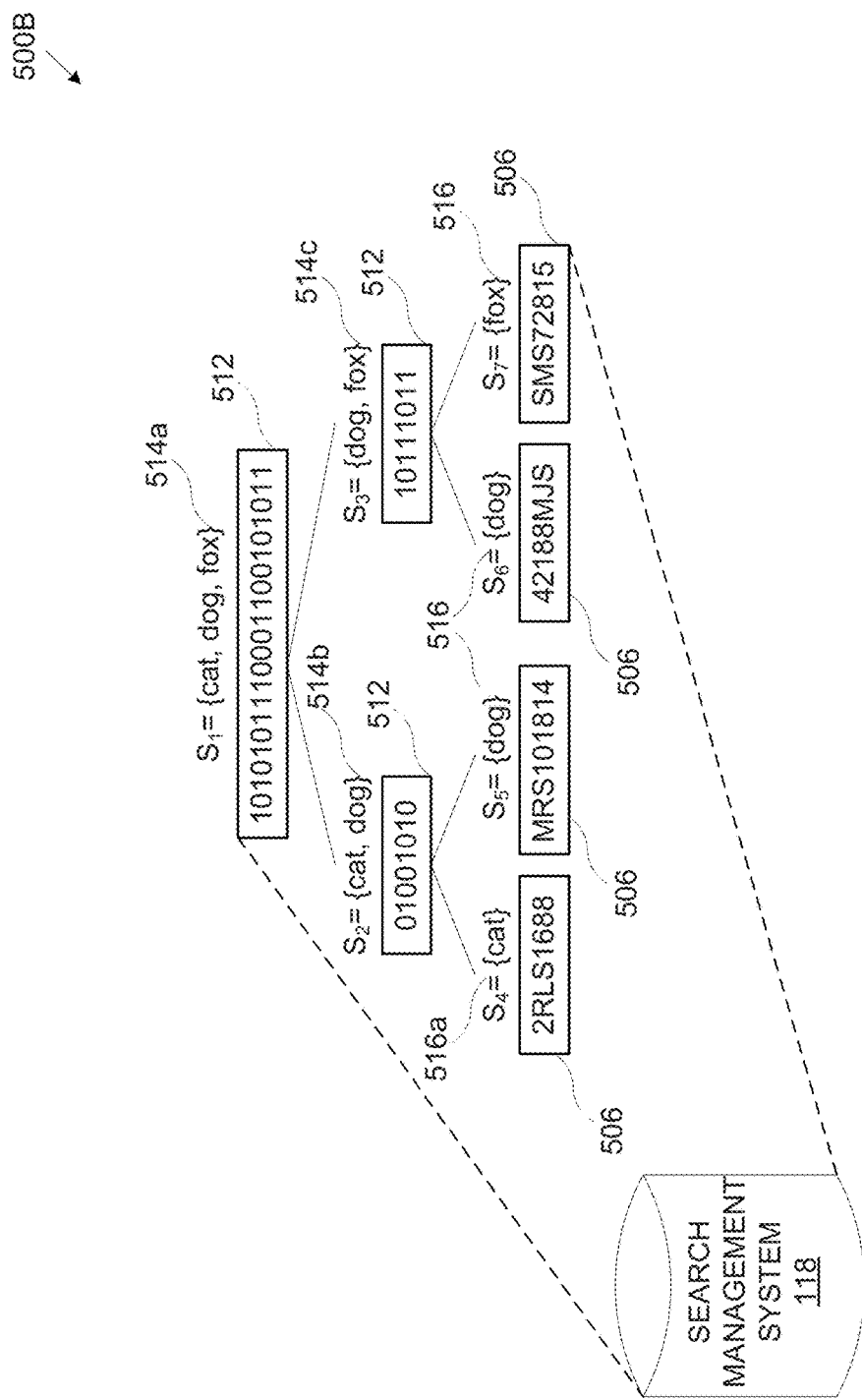
FIG. 5B: EXEMPLARY FILTER-GRADIENT TREE

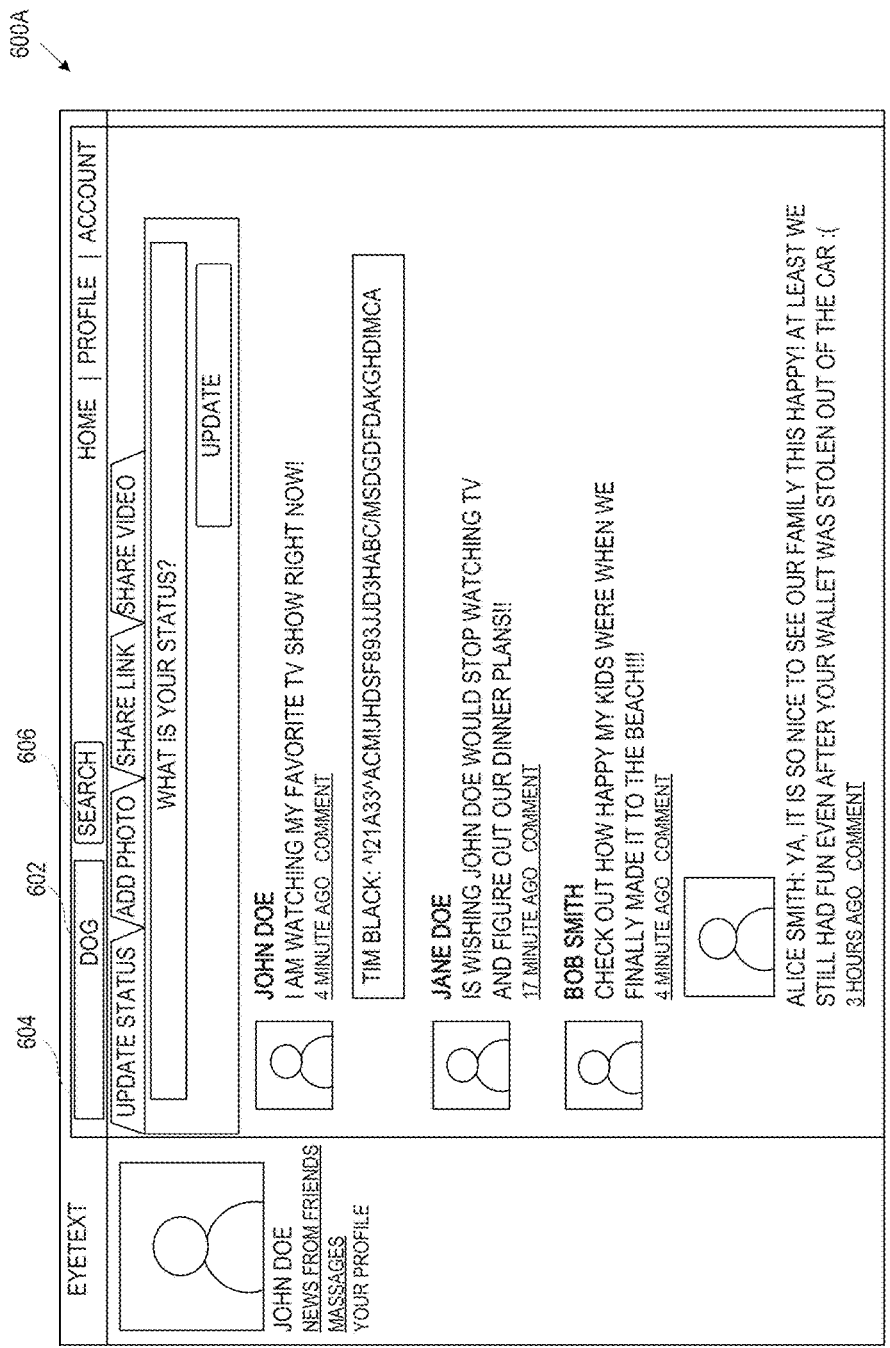
FIG. 6A: EXEMPLARY CRYPTOGRAPHICALLY-SECURE QUERY SCREENSHOT

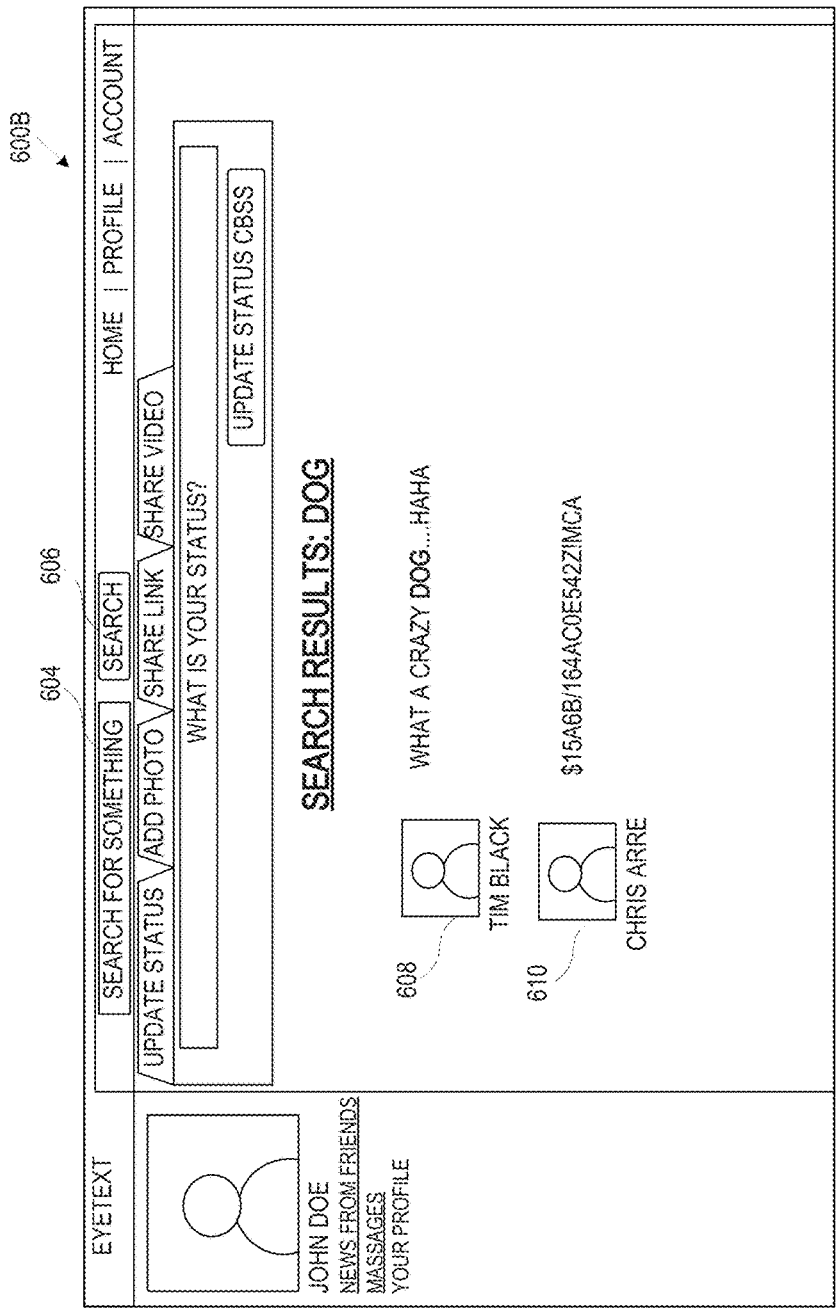
FIG. 6B: EXEMPLARY CRYPTOGRAPHICALLY-SECURE QUERY SCREENSHOT

SYSTEMS AND METHODS FOR CRYPTOGRAPHICALLY-SECURE QUERIES USING FILTERS GENERATED BY MULTIPLE PARTIES

CROSS REFERENCE TO RELATED APPLICATIONS

This application claims priority to, the benefit under 35 U.S.C. § 119 of, and incorporates by reference herein in its entirety U.S. Provisional Patent Application No. 62/271,830, filed Dec. 28, 2015, and entitled "Systems and Methods for Cryptographically-Secure Queries Using Filters Generated by Multiple Parties."

TECHNICAL FIELD

The present systems and methods relate generally to cryptographically-secure queries and, more particularly, to systems and methods that permit the querying or searching of encrypted data in a cryptographically-secure manner.

BACKGROUND

With identity theft and data security breach incidents on the rise in today's digital age, data (information) security is a major concern for individuals and organizations. Generally speaking, most conventional data security systems are designed using either an asymmetric key-based infrastructure (alternatively known as a public-private key-based (PPK) infrastructure), or a symmetric key-based infrastructure. To prevent data loss, however, these systems often compromise usability for security. For example, it is very difficult to search encrypted data using unencrypted search terms because traditionally the data must be decrypted before the search can be conducted. This decryption takes time and is computationally draining and inefficient, as each piece of data to be searched must be decrypted. Further, many such searches are not even possible in conventional systems as a given user may not have the appropriate authority to decrypt certain data. Thus, certain data to be searched will either not be surfaced to the user or, worse, may be provided to the user without proper authorization. These difficulties are only exacerbated by encryption-at-rest systems that only decrypt the original data in limited circumstances when proper authorization has been verified, which means that a search of the original data using unencrypted search terms is currently impossible.

Therefore, there is a long-felt but unresolved need for a system or method that permits querying encrypted data in a cryptographically-secure manner.

BRIEF SUMMARY OF THE DISCLOSURE

Briefly described, and according to one embodiment, aspects of the present disclosure generally relate to systems and methods that permit the querying of encrypted data in a cryptographically-secure manner.

Data in certain computing architectures may be difficult if not impossible to search/query against. For example, the data may be in an encrypted/obfuscated format, which limits the efficacy of plaintext searches of the data. In another example, the data may be stored and/or managed in a separate location or system that prevents the use of a native search functionality to query the data. Generally, "filters" are probabilistic algorithms or other mathematical objects that can quickly decide whether a given element is within a given set (e.g., filters solve the set membership problem by efficiently testing whether a large set of data contains a particular item). Thus, filters are created to efficiently represent a large set of data so that a subsequent user can determine whether an item is within the original set of data through access to just the filter. Examples of filters include, but are not limited to, Bloom filters, SAT filters, and other types of set membership filters. According to the present disclosure, in computing architectures where the data is difficult to search/query against, the filter may be used to represent the data so that a subsequent user, with access to only the filter, may determine whether his or her particular search term/query is within that data without querying/searching the data.

In various embodiments, an electronic computing device receives data (e.g., through input of the data, selection of the data, creation of data, etc.) for which a filter is to be generated so that a subsequent user can securely query the received data. This received data may need to be securely queried for many reasons including, but not limited to, the received data will be encrypted (thereby making a plaintext search of the received data ineffective), the received data will be stored in a location that does not permit querying, etc. Examples of data for which filters may be generated include (but are not limited to) text files, audio files, video files, data files, system files, image files, or any form of digital data comprising emails, electronic documents, online messages, social media posts, web-based forms, etc., or any variant, sub-part, portion, or combination thereof. In one embodiment, this data may be a document containing sensitive data that will be encrypted.

Generally, to generate filters, in one embodiment, the electronic computing device preprocesses the received data by identifying discrete phrases within the received data, removing redundant phrases, removing commonly-used phrases (e.g., "an"), stemming the phrases, etc. The electronic computing device transforms the preprocessed data according to a predefined algorithm to mask the data from a third party system so that the third party system (or any other observer such as a nefarious party or the search management system discussed herein) will have no knowledge of the phrases. In one embodiment, the third party system is a system that is operated separate and distinct from the electronic computing device. The electronic computing device transmits the masked phrases to the third party system, in one embodiment, wherein the third party system transforms the masked phrases using a predefined cryptographic algorithm and a cryptographic key, which is known only to the third party system, to generate a secured version of the masked phrases and transmits that secured version of the masked phrases back to the electronic computing device. Upon receipt of the secured version of the masked phrases, in one embodiment, the electronic computing device extracts the secured version of the masked phrases using a predefined algorithm. The electronic computing device generates the filter based on the extracted secured version of the masked phrases for subsequent secure querying of the received data. In various embodiments, the filter may be stored in a linear data structure (e.g., record, array, etc.) or a nonlinear data structure (e.g., filter-gradient ("FiG") tree, hash and inverted index table ("HiiT"), inverted index, multidimensional filter, etc.).

In various embodiments, subsequent to the previously-described secure-filter generation process, an electronic computing device (which may or may not be the same electronic computing device operated by the same or a different user from the secure-filter generation process)

receives one or more query terms for which a secure query is to be conducted to determine whether the previously-received data includes the one or more query terms. Generally, to securely query the filters (corresponding to previously received data), in one embodiment, the electronic computing device preprocesses the received query terms by identifying discrete phrases within the received query terms, removing redundant phrases, removing commonly-used phrases (e.g., "an"), stemming the phrases, etc. The electronic computing device transforms the preprocessed query terms according to a predefined algorithm to mask the query terms from the third party system so that the third party system (or any other observer) will have no knowledge of the query terms. The electronic computing device transmits the masked query terms to the third party system, in one embodiment, wherein the third party system transforms the masked query terms using a predefined cryptographic algorithm and a cryptographic key, which is known only to the third party system, to generate a secured version of the masked query terms and transmits that secured version of the masked query terms back to the electronic computing device. Upon receipt of the secured version of the masked query terms, in one embodiment, the electronic computing device extracts the secured version of the masked query terms using a predefined algorithm. The electronic computing device generates a secure query based on the extracted secured version of the masked query terms and compares, in one embodiment using the search management system discussed herein, that secure query to previously generated filters to determine whether the previously-received data includes the one or more query terms. In one embodiment, the secured version of a particular phrase is the same regardless of whether it was generated during the securing or querying process, which enables the filters to represent the originally-received data and the queries to accurately determine whether the query terms are within the originally-received data. If the secure query identifies one or more items of received data, then the electronic computing device may retrieve those one or more items of received data (and decrypt those items of received data if necessary).

To provide ordered/ranked query results as part of the previously-described secure-query process, in various embodiments, the electronic computing device, as part of the previously-described secure-filter generation process, computes a rank record comprising encrypted metadata regarding the received data (e.g., file identifier, author identity, author role within the enterprise, date created, number of times accessed, phrase frequency within data, phrase location within data, etc.) and transmits the rank record to a ranking system for storage and management. Generally, the rank record is constructed from the extracted secured phrases such that a party with access to two of the previously discussed entities (e.g., electronic computing device, ranking system, third party system, search management system, and the storage location of the encrypted data) must have access to a third entity of the same to gain access to the data stored therein. Thus, to order/rank the query results of the previously-described secure-query process, the electronic computing device, after receiving the query results, in one embodiment, computes a rank index identifying each of the data items within the query results and transmits that rank index to the ranking system. In one embodiment, the ranking system retrieves the relevant metadata corresponding to the data items identified within the rank index and provides that metadata back to the electronic computing device. The electronic computing device, in one embodiment, then uses that metadata to order/rank the query results (e.g., by date created, by date last accessed, by number of times accessed, by author, etc.). In an alternate embodiment, a maintenance operation of the ranking system, search management system, and storage location of the encrypted data re-sorts the order of the filters in the search management system (e.g., based on counters for the number of times data has been accessed, returned in results, etc.) so that the order of query results themselves is changed. Generally, re-sorting the order of the filters may be used to improve the relevance of the results in addition to or in place of sorting by the electronic computing device, as well as ensure that the search management system searches the filters that are most likely to be relevant before those filters that are likely to be less relevant.

In one embodiment, the disclosed systems and methods operate within the context of an encryption system that encrypts data and manages access to that encrypted data for a particular user, enterprise, and/or organization (an exemplary version of which is described in U.S. Pat. No. 9,224,000, entitled, "Systems and Methods for Providing Information Security Using Context-Based Keys," the disclosure of which is incorporated by reference herein). In various embodiments, that encryption system may comprise a distributed architecture with a cloud-based platform (an exemplary version of which is described in U.S. patent application Ser. No. 15/017,255, entitled, "Systems and Methods for Encryption and Provision of Information Security Using Platform Services," and filed on Feb. 5, 2016, the disclosure of which is incorporated by reference herein). Accordingly, the disclosed systems and methods enable querying/searching of data that is encrypted by the encryption system by generating filters using multiple parties. Similarly, the encryption system decrypts results that are identified by querying of the filters of the disclosed systems and methods.

In one embodiment, a method, comprising the steps of: receiving data at a first electronic computing device, the data comprising a plurality of phrases; encrypting, at the first electronic computing device, the received data according to a first predetermined cryptographic algorithm to generate an encrypted output of the received data; transmitting, from the first electronic computing device, the encrypted output of the received data to a storage system for storage; transforming, at the first electronic computing device, each of the plurality of phrases according to a first predetermined algorithm to generate a masked version of each of the plurality of phrases; transmitting, from the first electronic computing device, the masked version of each of the plurality of phrases to a third party system for securing the masked version of each of the plurality of phrases; receiving, at the first electronic computing device, the secured version of the plurality of phrases from the third party system; generating, at the first electronic computing device, a filter representative of the received data based on the received secured version of the plurality of phrases; transmitting, from the first electronic computing device, the filter to a search system for subsequent searching of the filter; receiving a search request at a second electronic computing device, the search request comprising one or more phrases to be searched against the received data; transforming, at the second electronic computing device, each of the one or more phrases according to a second predetermined algorithm to generate a masked version of each of the one or more phrases; transmitting, from the second electronic computing device, the masked version of each of the one or more phrases to the third party system for securing the masked version of each of the one or more phrases; receiving, at the second electronic computing device, the secured version of the one or more phrases from the third party system;

transforming, at the second electronic computing device, the received secured version of the one or more phrases according to a third predetermined algorithm to generate query data; transmitting, from the second electronic computing device, the query data to the search system for comparing to the filter to identify whether the one or more phrases may be present in the received data; receiving, at the second electronic computing device, a list of the received data that may comprise the one or more phrases; retrieving, from the storage system, encrypted output of the received data corresponding to the list of the received data that may comprise the one or more phrases; and decrypting, at the second electronic computing device, the retrieved encrypted output of the received data according to a second predetermined cryptographic algorithm to generate a decrypted output of the received data.

In one embodiment, a method, comprising the steps of: receiving data at an electronic computing device, the data comprising a plurality of phrases; transforming each of the plurality of phrases according to a predetermined algorithm to generate a masked version of each of the plurality of phrases; transmitting the masked version of each of the plurality of phrases to a third party system for securing the masked version of each of the plurality of phrases; receiving, at the electronic computing device, the secured version of the plurality of phrases from the third party system; and generating a filter representative of the received data based on the received secured version of the plurality of phrases.

In one embodiment, a system, comprising: an electronic computing device that receives data comprising a plurality of phrases, wherein the electronic computing device transforms each of the plurality of phrases according to a predetermined algorithm to generate a masked version of each of the plurality of phrases and transmits the masked version of each of the plurality of phrases to a third party system; the third party system that receives the masked version of each of the plurality of phrases from the electronic computing device, wherein the third party system transforms the masked version of each of the plurality of phrases according to a predetermined cryptographic algorithm to generate a secured version of the plurality of phrases and transmits the secured version of the plurality of phrases back to the electronic computing device; and the electronic computing device that receives the secured version of the plurality of phrases from the third party system, wherein the electronic computing device generates a filter representative of the received data based on the received secured version of the plurality of phrases.

In one embodiment, a method, comprising the steps of: receiving a search request at an electronic computing device, the search request comprising one or more phrases to be searched against a plurality of filters representing a plurality of data items; transforming each of the one or more phrases according to a first predetermined algorithm to generate a masked version of each of the one or more phrases; transmitting the masked version of each of the one or more phrases to a third party system for securing the masked version of each of the one or more phrases; receiving, at the electronic computing device, the secured version of the one or more phrases from the third party system; transforming the received secured version of the one or more phrases according to a second predetermined algorithm to generate query data; and comparing the query data to the plurality of filters to identify one or more data items corresponding to the search request.

In one embodiment, a system, comprising: an electronic computing device that receives a search request comprising one or more phrases to be searched against a plurality of filters representing one or more data items, wherein the electronic computing device transforms each of the one or more phrases according to a first predetermined algorithm to generate a masked version of each of the one or more phrases and transmits the masked version of each of the one or more phrases to a third party system; the third party system that receives the masked version of each of the one or more phrases from the electronic computing device, wherein the third party system transforms the masked version of each of the one or more phrases according to a predetermined cryptographic algorithm to generate a secured version of the one or more phrases and transmits the secured version of the one or more phrases back to the electronic computing device; and the electronic computing device that receives the secured version of the one or more phrases from the third party system, wherein the electronic computing device transforms the received secured version of the one or more phrases according to a second predetermined algorithm to generate query data and compares the query data to the plurality of filters to identify one or more data items corresponding to the search request.

According to one aspect of the present disclosure, the method, further comprising the step of encrypting the received data to generate encrypted data prior to transforming each of the plurality of phrases. Furthermore, the method, further comprising the step of storing the encrypted data for subsequent use. Moreover, the method, further comprising the step of preprocessing the received data prior to transforming each of the plurality of phrases according to predefined rules for removal of redundant phrases from, removal of commonly-used phrases from, and/or stemming of the plurality of phrases. Further, the method, further comprising the step of transmitting the filter to a search system for use in connection with subsequent searching of the data. Additionally, the method, further comprising the step of receiving contextual data corresponding to creation of the received data. Also, the method, wherein the secured version of the plurality of phrases further comprises the contextual data, the filter further comprises the contextual data, and the step of transmitting the masked version of each of the plurality of phrases further comprises transmitting the contextual data to the third party system.

According to one aspect of the present disclosure, the method, wherein the contextual data is stored in association with the filter for subsequent use. Moreover, the method, wherein the contextual information is selected from the group comprising: a user identifier associated with a user entering the received data, a user identifier of a user interacting with the received data, a session identifier, a time instant at which the received data was generated, a time instant at which the received data was accessed, an electronic device identifier, an application program identifier, an enterprise identifier, a network address, a column header, a data field, a data identifier, a geographic location, a network topology. Further, the method, wherein the third party system is managed separately from the electronic computing device. Additionally, the method, wherein the electronic computing device has no access to or knowledge of a cryptographic key used to secure the masked version of the plurality of phrases. Also, the method, wherein the step of generating the filter further comprises transforming the received secured version of the plurality of phrases according to a second predetermined algorithm to extract the secured version of the plurality of phrases and generating the filter corresponding to the received data based on the extracted secured version of the plurality of phrases.

According to one aspect of the present disclosure, the system, wherein the electronic computing device encrypts the received data to generate encrypted data prior to transforming each of the plurality of phrases. Furthermore, the system, wherein the electronic computing device stores the encrypted data for subsequent use. Moreover, the system, wherein the electronic computing device preprocesses the received data prior to transforming each of the plurality of phrases according to predefined rules for removal of redundant phrases from, removal of commonly-used phrases from, and/or stemming of the plurality of phrases. Further, the system, further comprising a search system that receives the filter from the electronic computing device for use in connection with subsequent searching of the data. Additionally, the system, wherein the electronic computing device receives contextual data corresponding to creation of the received data. Also, the system, wherein the secured version of the plurality of phrases further comprises the contextual data, the filter further comprises the contextual data, and the electronic computing device transmits the contextual data to the third party system along with the masked version of each of the plurality of phrases.

According to one aspect of the present disclosure, the system, wherein the contextual data is stored in association with the filter for subsequent use. Furthermore, the system, wherein the contextual information is selected from the group comprising: a user identifier associated with a user entering the received data, a user identifier of a user interacting with the received data, a session identifier, a time instant at which the received data was generated, a time instant at which the received data was accessed, an electronic device identifier, an application program identifier, an enterprise identifier, a network address, a column header, a data field, a data identifier. Moreover, the system, wherein the third party system transforms the masked version of each of the plurality of phrases according to one or more predefined policies. Further, the system, wherein the third party system is managed separately from the electronic computing device. Additionally, the system, wherein the electronic computing device has no access to or knowledge of a cryptographic key used to secure the masked version of the plurality of phrases. Also, the system, wherein the third party system transforms the masked version of each of the plurality of phrases using the cryptographic key. Furthermore, the system, wherein the electronic computing device transforms the received secured version of the plurality of phrases according to a second predetermined algorithm to extract the secured version of the plurality of phrases and generates the filter corresponding to the received data based on the extracted secured version of the plurality of phrases.

According to one aspect of the present disclosure, the method, wherein the step of comparing further comprises: transmitting the query data to a search system for determining a list of references to the one or more data items corresponding to the search request by comparing the query data to the plurality of filters; receiving, at the electronic computing device, the list of references to the one or more data items corresponding to the search request; and accessing, based on the list of references to the one or more data items corresponding to the search request, the one or more data items corresponding to the search request. Moreover, the method, wherein the step of accessing further comprises decrypting the one or more data items corresponding to the search request. Further, the method, further comprising the step of preprocessing the search request prior to transforming each of the one or more phrases according to predefined rules for removal of redundant phrases from, removal of commonly-used phrases from, and/or stemming of the plurality of phrases. Additionally, the method, wherein the step of comparing further comprises identifying contextual data corresponding to the one or more data items corresponding to the search request. Also, the method, wherein the third party system is managed separately from the electronic computing device. Furthermore, the method, wherein the electronic computing device has no access to or knowledge of a cryptographic key used to secure the masked version of each of the one or more phrases. Moreover, the method, wherein the one or more phrases are cleartext and the plurality of data items are ciphertext.

According to one aspect of the present disclosure, the system, further comprising a search system that receives the query data from the electronic computing device, wherein the search system compares the query data to the plurality of filters to determine a list of references to the one or more data items corresponding to the search request and transmits the list of references to the one or more data items corresponding to the search request back to the electronic computing device; and the electronic computing device that receives the list of references to the one or more data items corresponding to the search request from the search system, wherein the electronic computing device accesses the one or more data items corresponding to the search request based on the list of references to the one or more data items corresponding to the search request. Further, the system, wherein the electronic computing device decrypts the one or more data items corresponding to the search request as part of accessing the one or more data items corresponding to the search request. Additionally, the system, wherein the electronic computing device preprocesses the search request prior to transforming each of the one or more phrases according to predefined rules for removal of redundant phrases from, removal of commonly-used phrases from, and/or stemming of the plurality of phrases. Also, the system, wherein the step of comparing further comprises identifying contextual data corresponding to the one or more data items corresponding to the search request. Furthermore, the system, wherein the third party system is managed separately from the electronic computing device. Moreover, the system, wherein the electronic computing device has no access to or knowledge of a cryptographic key used to secure the masked version of each of the one or more phrases. Further, the system, wherein the third party system transforms the masked version of each of the one or more phrases using the cryptographic key. Additionally, the system, wherein the one or more phrases are cleartext and the one or more data items are ciphertext.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary, high-level overview of one embodiment of the disclosed system.

FIG. 2 (consisting of FIGS. 2A, 2B, 2C, 2D, and 2E) illustrates exemplary architectures of one embodiment of the disclosed system.

FIG. 3 (consisting of FIGS. 3A, 3B, and 3C) illustrates sequence diagrams showing an exemplary secure-filter generation process, according to one embodiment of the present disclosure.

FIG. 4 (consisting of FIGS. 4A and 4B) illustrates sequence diagrams showing an exemplary cryptographically-secure query process, according to one embodiment of the present disclosure.

FIG. 5 (consisting of FIGS. 5A and 5B) illustrates exemplary filter storage schemas, according to one embodiment of the present disclosure.

FIG. 6 (consisting of FIGS. 6A and 6B) illustrates screenshots of an exemplary cryptographically-secure query, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to systems and methods that permit the querying of encrypted data in a cryptographically-secure manner.

Data in certain computing architectures may be difficult if not impossible to search/query against. For example, the data may be in an encrypted/obfuscated format, which limits the efficacy of plaintext searches of the data. In another example, the data may be stored and/or managed in a separate location or system that prevents the use of a native search functionality to query the data. Generally, "filters" are probabilistic algorithms or other mathematical objects that can quickly decide whether a given element is within a given set (e.g., filters solve the set membership problem by efficiently testing whether a large set of data contains a particular item). Thus, filters are created to efficiently represent a large set of data so that a subsequent user can determine whether an item is within the original set of data through access to just the filter. Examples of filters include, but are not limited to, Bloom filters, SAT filters, and other types of set membership filters. According to the present disclosure, in computing architectures where the data is difficult to search/query against, the filter may be used to represent the data so that a subsequent user, with access to only the filter, may determine whether his or her particular search term/query is within that data without querying/searching the data.

In various embodiments, an electronic computing device receives data (e.g., through input of the data, selection of the data, creation of data, etc.) for which a filter is to be generated so that a subsequent user can securely query the received data. This received data may need to be securely queried for many reasons including, but not limited to, the received data will be encrypted (thereby making a plaintext search of the received data ineffective), the received data will be stored in a location that does not permit querying, etc. Examples of data for which filters may be generated include (but are not limited to) text files, audio files, video files, data files, system files, image files, or any form of digital data comprising emails, electronic documents, online messages, social media posts, web-based forms, etc., or any variant, sub-part, portion, or combination thereof. In one embodiment, this data may be a document containing sensitive data that will be encrypted.

Generally, to generate filters, in one embodiment, the electronic computing device preprocesses the received data by identifying discrete phrases within the received data, removing redundant phrases, removing commonly-used phrases (e.g., "an"), stemming the phrases, etc. The electronic computing device transforms the preprocessed data according to a predefined algorithm to mask the data from a third party system so that the third party system (or any other observer such as a nefarious party or the search management system discussed herein) will have no knowledge of the phrases. In one embodiment, the third party system is a system that is operated separate and distinct from the electronic computing device. The electronic computing device transmits the masked phrases to the third party system, in one embodiment, wherein the third party system transforms the masked phrases using a predefined cryptographic algorithm and a cryptographic key, which is known only to the third party system, to generate a secured version of the masked phrases and transmits that secured version of the masked phrases back to the electronic computing device. Upon receipt of the secured version of the masked phrases, in one embodiment, the electronic computing device extracts the secured version of the masked phrases using a predefined algorithm. The electronic computing device generates the filter based on the extracted secured version of the masked phrases for subsequent secure querying of the received data. In various embodiments, the filter may be stored in a linear data structure (e.g., record, array, etc.) or a nonlinear data structure (e.g., FiG tree, HiiT, inverted index, multidimensional filter, etc.).

In various embodiments, subsequent to the previously-described secure-filter generation process, an electronic computing device (which may or may not be the same electronic computing device operated by the same or a different user from the secure-filter generation process) receives one or more query terms for which a secure query is to be conducted to determine whether the previously-received data includes the one or more query terms. Generally, to securely query the filters (corresponding to previously received data), in one embodiment, the electronic computing device preprocesses the received query terms by identifying discrete phrases within the received query terms, removing redundant phrases, removing commonly-used phrases (e.g., "an"), stemming the phrases, etc. The electronic computing device transforms the preprocessed query terms according to a predefined algorithm to mask the query terms from the third party system so that the third party system (or any other observer) will have no knowledge of the query terms. The electronic computing device transmits the masked query terms to the third party system, in one embodiment, wherein the third party system transforms the masked query terms using a predefined cryptographic algorithm and a cryptographic key, which is known only to the third party system, to generate a secured version of the masked query terms and transmits that secured version of the masked query terms back to the electronic computing device. Upon receipt of the secured version of the masked query terms, in one embodiment, the electronic computing device extracts the secured version of the masked query terms using a predefined algorithm. The electronic computing device generates a secure query based on the extracted secured version of the masked query terms and compares, in one embodiment using the search management system discussed herein, that secure query to previously generated filters to determine whether the previously-received data includes the one or more query terms. In one embodiment, the secured version of a particular phrase is the same regardless of whether it was generated during the securing or querying process, which enables the filters to represent the originally-received data and the queries to accurately determine whether the query terms are within the originally-received data. If the secure query identifies one or more items of received data, then the electronic computing device may retrieve those one or more items of received data (and decrypt those items of received data if necessary).

To provide ordered/ranked query results as part of the previously-described secure-query process, in various embodiments, the electronic computing device, as part of the previously-described secure-filter generation process, computes a rank record comprising encrypted metadata regarding the received data (e.g., file identifier, author identity, author role within the enterprise, date created, number of times accessed, phrase frequency within data, phrases location within data, etc.) and transmits the rank record to a ranking system for storage and management. Generally, the rank record is constructed from the extracted secured phrases such that a party with access to two of the previously discussed entities (e.g., electronic computing device, ranking system, third party system, search management system, and the storage location of the encrypted data) must have access to a third entity of the same to gain access to the data stored therein. Thus, to order/rank the query results of the previously-described secure-query process, the electronic computing device, after receiving the query results, in one embodiment, computes a rank index identifying each of the data items within the query results and transmits that rank index to the ranking system. In one embodiment, the ranking system retrieves the relevant metadata corresponding to the data items identified within the rank index and provides that metadata back to the electronic computing device. The electronic computing device, in one embodiment, then uses that metadata to order/rank the query results (e.g., by date created, by date last accessed, by number of times accessed, by author, etc.).

In one embodiment, the disclosed systems and methods operate within the context of an encryption system that encrypts data and manages access to that encrypted data for a particular user, enterprise, and/or organization (an exemplary version of which is described in U.S. Pat. No. 9,224,000, entitled, "Systems and Methods for Providing Information Security Using Context-Based Keys," the disclosure of which is incorporated by reference herein). In various embodiments, that encryption system may comprise a distributed architecture with a cloud-based platform (an exemplary version of which is described in U.S. patent application Ser. No. 15/017,255, entitled, "Systems and Methods for Encryption and Provision of Information Security Using Platform Services," and filed on Feb. 5, 2016, the disclosure of which is incorporated by reference herein). Accordingly, the disclosed systems and methods enable querying/searching of data that is encrypted by the encryption system by generating filters using multiple parties. Similarly, the encryption system decrypts results that are identified by querying of the filters of the disclosed systems and methods.

Exemplary Embodiments

Referring now to the figures, for the purposes of example and explanation of the fundamental processes and components of the disclosed systems and methods, reference is made to FIG. 1, which illustrates an exemplary, high-level overview 100 of one embodiment of the disclosed system. As will be understood and appreciated, the exemplary, high-level overview 100 shown in FIG. 1 represents merely one approach or embodiment of the present system, and other aspects are used according to various embodiments of the present system. Generally, by way of example, and not by way of limitation, a high-level overview of actions involved in an exemplary secure-filter generation process is shown in FIG. 1 with the help of a sequence of numbered steps indicated as steps "C1" through "C4," which are annotated in circles. Similarly, by way of example, and not by way of limitation, a high-level overview of actions involved in exemplary cryptographically-secure query process is shown in FIG. 1 with the help of a sequence of numbered steps indicated as steps "S1" through "S6," which are annotated in circles.

In one non-limiting example, a user may be generating data that will be stored in an encrypted/obfuscated format (e.g., a document containing the phrase "Dog"), which will limit the efficacy of subsequent plaintext searches of the generated data. Thus, as part of data generation, steps C1 through C4 of the secure-filter generation process occur to generate filter(s) that the user or a subsequent user may use to determine whether one or more query terms are present in the generated data. To that effect, when the user or a subsequent user attempts to search the original generated data for one or more query terms (e.g., the phrase "Dog"), steps S1 through S6 of the cryptographically-secure query process occur to determine, from the previously-generated filter(s), whether the one or more query terms are present in the original generated data. In another example, the data for which filters are created (at steps C1 through C4 of the secure-filter generation process) may be stored and/or managed in a separate location or system that prevents the use of a native search functionality to query the data but permits steps S1 through S6 of the cryptographically-secure query process to replace that native search functionality. Generally, each of the steps C1 through C4 and S1 through S6 may occur automatically (e.g., without a manual action or step of selecting the step to occur) based on one or more predefined rules (e.g., for a particular data type or user role, certain data will be processed in accordance with this disclosure).

As shown in the overview 100, the secure-filter generation process generally commences, at step C1, with a creator 102 entering data 104 into an electronic computing device 106 (e.g., laptop/desktop computer, smartphone, tablet computer, etc.), wherein a subsequent searcher 108 may be able to securely query the entered data 104. Although the creator 102 and subsequent searcher 108 are referenced herein as if they are humans, this disclosure places no limitations on the type of user of the disclosed system (e.g., another computer system, a server, a human, another software program, etc.). Further details of the electronic computing device 106 will be discussed in association with the description of FIG. 2. In one embodiment, the creator 102 may not enter data 104 into the electronic computing device 106 but may instead select data 104 (e.g., existing files, etc.) for which the secure-filter generation process will occur. In various embodiments, examples of data 104 include (but are not limited to) text files, audio files, video files, data files, system files, image files, or any form of digital data comprising emails, electronic documents, online messages, social media posts, web-based forms, etc., or any variant, sub-part, portion, or combination thereof. Generally, the data 104 is generated by or associated with a user's entry or input with any kind of application programs and/or hardware across a variety of computing devices. For example, in one embodiment, data 104 is a document in cleartext or plaintext (e.g., unencrypted form) that contains the phrase "Dog." Data 104, as shown in FIG. 1, should be understood as one non-limiting example because data 104 could be in ciphertext (e.g., encrypted form) prior to storage in an encrypted data storage system 110.

After entry of data 104, in one embodiment, the data 104 may be encrypted, by the electronic computing device 106 or another system, and stored in the encrypted data storage system 110. In one embodiment, the data 104 may be stored in the encrypted data storage system 110 in unencrypted form. In various embodiments, the encrypted data storage system 110 may be a separate system from or local to the electronic computing device 106 (e.g., for security and/or efficiency purposes the electronic computing device 106 and encrypted data storage system 110 may have a distributed architecture). Further details of the encrypted data storage system 110 will be discussed in association with the description of FIG. 2. Generally, this disclosure should be understood to place no restrictions on the method of encryption (e.g., encryption at rest, encryption in motion, etc.) or cryptographic algorithm used to perform the same (e.g., AES, RSA, etc.). In one embodiment, the encryption may be context-based (an exemplary version of which is described in U.S. Pat. No. 9,224,000, entitled, "Systems and Methods for Providing Information Security Using Context-Based Keys," previously referenced herein). As will occur to one having ordinary skill in the art, when the data 104 is encrypted, plaintext querying of terms in the encrypted data (e.g., searching for the term "dog") will not be successful and another method/process/system may be necessary to query the encrypted data. Thus, after/before/while encrypting and storing the data 104 as part of step C1, the electronic computing device 106, in one embodiment, may retain an unencrypted copy of the data 104 for additional processing. In various embodiments, encryption of data 104 may not occur at all, and the data 104 may be stored in the encrypted data storage system 110 in unencrypted form.

Still referring to FIG. 1, at step C2 in various embodiments, the electronic computing device 106 processes the data 104 to make querying the data 104 more efficient and effective by generating a list of discrete phrases contained within the data 104. Generally, the phrases may be, but are not limited to, specific words (e.g., "dog"), combination of letters (e.g., "do"), a combination of words and/or letters, full sentences, portions of audio, video, or image files, etc. In one embodiment, the data 104 is processed according to certain predefined rules to make the queries more efficient and secure by removing redundant phrases, removing commonly-used phrases (e.g., "the"), normalizing the data 104, stemming the data 104, etc. Once the list of discrete phrases has been compiled, in one embodiment, the electronic computing device 106 masks each of the discrete phrases using an algorithm so that a third party system 112 cannot determine the original phrases (e.g., cannot determine that the data 104 contained the word "Dog"). In various embodiments, the electronic computing device 106 transmits the masked phrases 114 to the third party system 112 for further processing.

In various embodiments at step C3, the third party system 112 receives and secures the masked phrases 114 using an algorithm and a cryptographic key, which is only known to the third party. In one embodiment, securing the masked phrases 114 is a different process that is separate and distinct from the encrypting process that may occur at step C1. Accordingly, no system, user, or party will be able to generate the secured versions 116 of the phrases without access to the cryptographic key (e.g., creator 102, electronic computing device 106, etc. cannot generate the secured version 116 of "Dog"). Generally, the third party system 112 is operated separate and distinct from the electronic computing device 106. Further details of the third party system 112 will be discussed in association with the description of FIG. 2. In one embodiment, the third party system 112 transmits the secured versions 116 of the phrases back to the electronic computing device 106 for creation of a filter(s) 120. In one embodiment, steps C2 and C4 comprise a schema similar to Chaum's Blind Signature Scheme (further details of which are discussed in David L. Chaum, *Blind Signatures for Untraceable Payments*, in 82(3) Advances in Cryptology Proceedings of Crypto 199 (1983), the disclosure of which is incorporated by reference herein) or the use of an elliptic curve oblivious pseudorandom function.

At step C4 in various embodiments, the electronic computing device 106 receives and extracts the secured phrases 116 using an algorithm. Generally, the electronic computing device 106 creates one or more filters 120 based on the extracted secured phrases 116 and transmits that filter 120 to the search management system 118, where it is stored for use in subsequent secure querying of the data 104. In one embodiment, the electronic computing device 106 transmits the extracted secured phrases 116 to the search management system 118 (or another system not shown in FIG. 1), and the search management system 118 (or other system) creates the filter 120 based on the extracted secured phrases 116 and stores the filter 120 for use in subsequent secure querying of the data 104. Further details of the search management system 118 will be discussed in association with the description of FIG. 2.

The filter 120, in various embodiments, may be any probabilistic algorithm or other mathematical object that can quickly determine whether a given element is within a given set of data items (e.g., Bloom filters, Bloom-g filters, Bloom-Q filters, Counting Bloom filters, Spectral Bloom filters, SAT filters, set membership filters, Cuckoo filters, etc.) (further details of some filters are discussed in Sean A. Weaver et al., *Satisfiability-based Set Membership Filters*, in 8 Journal on Satisfiability, Boolean Modeling and Computation 129 (2014), the disclosure of which is incorporated by reference herein). Generally, a filter solves the set membership problem by efficiently testing whether a large set of data contains a particular item. Thus, a filter is created to efficiently represent a set of data so that a subsequent user can determine whether an item is within the original set of data through access to just that filter. The filter 120 may comprise any format capable of performing the functionality described herein (e.g., the filter 120 can determine, based on the secured version 116 of "Dog" whether the term "Dog" was in the previously-received data 104). Thus, the filter 120 shown in FIG. 1 is for exemplary purposes only and is not to be considered limiting in format, size, content, etc. Similarly, in various embodiments, one or more filters 120 may correspond to one item of data 104 (e.g., one file may have multiple corresponding filters) or one filter 120 may correspond to multiple items of data 104 (e.g., one filter may correspond to multiple files).

In one embodiment, as part of step C4, the electronic computing device 106 computes a rank record based on the extracted secured phrases 116 comprising metadata related to the data 104 (e.g., author, date created, position of the discrete phrases within the data 104, etc.). This rank record, in one embodiment, is transmitted to a ranking system (not shown in FIG. 1, but further details of which will be explained in association with FIG. 2) that manages and stores the rank records. Generally, the rank record is in a format such that neither the ranking system nor the electronic computing device 106 can identify either the data 104 to which it corresponds or the content that it contains independent of other actors (e.g., access to the other systems and devices disclosed herein). In various embodiments, the rank records may be used to rank or order the results of the cryptographically-secure query process so that the most-relevant results appear first. Generally, ranking the results makes the query more efficient such that the user need not sort through many irrelevant results to get to results that are more useful. Thus, after C4, in one embodiment, the secure-filter generation process ends.

Referring still to FIG. 1, as shown in the overview 100, the cryptographically-secure query process generally commences, at step S1, with a searcher 108 entering one or more query terms 122 (e.g., "DOG") into an electronic computing device 124 (e.g., laptop/desktop computer, smartphone, tablet computer, etc.) to search for one or more phrases in a given set of data (e.g., document files, social media posts, etc. that have already undergone the secure-filter generation process). The searcher 108 is actually querying against one or more previously-created filters 120 that correspond to data 104 previously entered by a creator 102; however, to the searcher 108, the cryptographically-secure query process appears to be the same as the native search functionality of the program/application that the searcher 108 is using. In one embodiment, the cryptographically-secure query process is an entirely different process from the native search functionality and does not appear to be the same as the native search functionality to the searcher 108. Generally, the searcher 108 may enter any query terms 122 via multiple inputs, including but not limited to the native search functionality of an application, program, or operating system, a specific-created secure search program or application, a ghosted search box within an application or program (e.g., a search box that appears to be the native search box but actually corresponds to the secure search), etc. The searcher 108 may be, in various embodiments, the same user as creator 102 or a different user (e.g., both the search 108 and the creator 102 may work for the same enterprise or organization, etc.). Similarly, the electronic computing device 124 may be, in various embodiments, the same device as electronic computing device 106 or a different device. Further details of the electronic computing device 124 will be discussed in association with the description of FIG. 2.

In various embodiments, the electronic computing device 124 processes the query term 122 to make the query more efficient and effective by generating a list of the query terms 122. In one embodiment, the query term 122 is processed according to certain predefined rules to make the queries more efficient and secure by removing redundant phrases, removing commonly-used phrases (e.g., "the"), normalizing the query term 122, stemming the query term 122, etc. Once the list of query terms 122 has been compiled, in one embodiment, the electronic computing device 124 masks each of the query terms 122 using an algorithm so that a third party system 112 cannot determine the original query terms 122 (e.g., "DOG"). In various embodiments, the electronic computing device 124 transmits the masked query terms 126 to the third party system 112 for further processing.

At step S2 in various embodiments, the third party system 112 receives and secures the masked query terms 126 using an algorithm and a cryptographic key, which is only known to the third party. Accordingly, no system, user, or party will be able to generate the secured versions 128 of the query terms without access to the cryptographic key. In one embodiment, the cryptographic key used in step S2 is the same as the cryptographic key used in step C3 (thus, the extracted secured versions 128 of the query terms would be identical to the extracted secured versions 116 of the phrases, if the query term 122 is identical to the phrase in the data 104). In one embodiment, the third party system 112 transmits the secured versions 128 of the query terms back to the electronic computing device 124 for querying the one or more filters 120.

At step S3 in various embodiments, the electronic computing device 124 receives and extracts the secured versions 128 of the query terms using an algorithm. Generally, the electronic computing device 124 creates a query based on the extracted versions 128 of the query terms and transmits that query to a search management system 118. In one embodiment, steps C1 through C3 and steps S1 through S3 are the same in that the algorithms used to mask, secure, and extract the data 104 or query term 122 are identical for a particular user or set of users. In one embodiment, steps S1 through S3 comprise a schema similar to Chaum's Blind Signature Scheme (previously referenced herein) or the use of an elliptic curve oblivious pseudorandom function.

In various embodiments at step S4, the search management system 118 compares the query against the one or more filters 120 to determine which data items may contain the query terms 122 (e.g., to determine whether "dog" is present in any data 104). Once the search management system 118 has determined which data items may contain the query terms 122, the search management system 118 compiles a list 130 of those data items and transmits that list 130 to the electronic computing device 124. The list 130 may comprise any format capable of performing the functionality described herein. Thus, the list 130 shown in FIG. 1 is for exemplary purposes only and is not to be considered limiting in format, size, content, etc.

Between steps S4 and S5, in various embodiments, the electronic computing device 124 may determine that the list 130 of data items should be ranked. Generally, as the list 130 of data items does not contain any data regarding the substance of the data items (e.g., date created, number of times the query term appears in a particular data item, etc.), it is impossible to effectively or meaningfully rank or order the list 130 without additional information. Thus, in one embodiment, the electronic computing device 124 computes a rank index that identifies each of the data items within the list 130 and any relevant metadata that will be used to rank the data items. In various embodiments, the electronic computing device 124 transmits the rank index to the ranking system (not shown in FIG. 1), which determines the appropriate rank records corresponding to the data items within the rank index, retrieves the requested metadata regarding those data items, and returns the requested metadata to the electronic computing device 124. The electronic computing device 124, in various embodiments, uses the metadata to rank or order the list 130 (e.g., in order from most recently created to oldest, from most recently edited to oldest, from highest number of query terms within the data item to least, etc.). Generally, both the rank index and metadata is in a format such that neither the ranking system nor the electronic computing device 124 can independently identify either the data item to which they correspond or the content that they contain.

Still referring to FIG. 1, at step S5 in various embodiments, the electronic computing device 124 receives the list 130 of data items corresponding to the query and retrieves the data items on the list 130. In one embodiment, the electronic computing device 124 transmits a request for the data items to an encrypted data storage system 110 and the encrypted data storage system 110 retrieves those data items and transmits them back to the electronic computing device 124. In various embodiments, the electronic computing device 124 and/or encrypted data storage system 110 performs a policy check to determine whether the searcher 108 may access the data items on the list 130 and returns only those data items for which the search 108 has permission to access. At step S6 in one embodiment, the electronic computing device 124 decrypts the data items so that decrypted versions 132 of the data items may be accessed on the electronic computing device 124. As shown in FIG. 1, the decrypted versions 132 are one non-limiting example of the data items and may be in encrypted format until decrypted (e.g., encrypted data is transmitted from the encrypted data storage system 110 to the electronic computing device 124). In one embodiment, the decrypted versions 132 of the data items may correspond to the data 104 entered as part of the secure-filter generation process. In one alternative embodiment, the encrypted data storage system 110 decrypts the data items and transmits them to the electronic computing device 124 as part of step S6. In one embodiment, after decryption, the electronic computing device 124 post-filters the results to remove any false positives (e.g., results that do not contain the query terms). Generally, after viewing the results of the query, the cryptographically-secure query process ends.

Referring now to FIG. 2 (consisting of FIGS. 2A, 2B, 2C, 2D, and 2E), exemplary architectures of embodiments of the disclosed system are shown. FIG. 2A illustrates an exemplary architecture 200A of a secure-filter generation system according to one embodiment of the present disclosure. FIG. 2B illustrates an alternative exemplary architecture 200B of a secure-filter generation system according to one embodiment of the present disclosure. FIG. 2C illustrates an alternative exemplary architecture 200C of a secure-filter generation system with ranked indexes according to one embodiment of the present disclosure. FIG. 2D illustrates an exemplary architecture 200D of a cryptographically-secure query system according to one embodiment of the present disclosure. FIG. 2E illustrates an exemplary architecture 200E of a cryptographically-secure query system with ranked indexes according to one embodiment of the present disclosure.

Now referring to FIG. 2A, in various embodiments, the secure-filter generation system comprises an electronic computing device 106, encrypted data storage system 110, third party system 112, and search management system 118 operatively connected via network 202. Generally, the electronic computing device 106 is any device that is capable of performing the functionality disclosed herein (e.g., desktop computer, laptop computer, tablet computer, smartphone, smartwatch, etc.). In various embodiments, the electronic computing device 106 communicates via network 202 with the encrypted data storage system 110, third party system 112, and search management system 118 to perform the secure-filter generation process. Further details of the secure-filter generation process will be discussed in association with the description of FIG. 3. Generally, network 202 may be a secure or unsecured connection, local area network, the internet, etc. Thus, the transmission to/from the electronic computing device 106, encrypted data storage system 110, third party system 112, and search management system 118 may be secure, encrypted, etc. In one embodiment, for security and/or efficiency purposes, the electronic computing device 106, encrypted data storage system 110, and/or search management system 118 may have a centralized architecture (e.g., instead of the distributed architecture shown in FIG. 2A).

The encrypted data storage system 110, in one embodiment, may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein. In one embodiment, the encrypted data storage system 110 is local to the electronic computing device 106 (e.g., the electronic computing device 106 comprises the encrypted data storage system 110).

Still referring to FIG. 2A, in various embodiments, the third party system 112 may be any computing device (e.g., desktop computer, laptop, servers, tablets, etc.), combination of computing devices, software, hardware, or combination of software and hardware that is capable of performing the functionality disclosed herein. In one embodiment, for efficiency and/or security purposes, the third party system 112 may comprise the encrypted data storage system 110 and/or search management system 118 (e.g., either system may be local to the third party system 112). Generally, the third party system 112 is operated separate and distinct from the electronic computing device 106. In one alternative embodiment, the third party system 112 is operated from a secure location within electronic computing device 106 using inter-process communication.

The search management system 118, in one embodiment, may be any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of performing the functionality disclosed herein.

Referring now to FIG. 2B, an alternative exemplary architecture 200B of a secure-filter generation system according to one embodiment of the present disclosure is shown. As shown, FIG. 2B is virtually identical to FIG. 2A, except that FIG. 2B relates to an alternative exemplary architecture 200B that also comprises a policy management system 204. Accordingly, except as discussed below, the discussion of FIG. 2A also applies to FIG. 2B. As will be understood and appreciated, the exemplary architectures shown in FIGS. 2A and 2B are provided for illustrative purposes only, and other architectures are possible within aspects of the present disclosure. Generally, the policy management system 204 may comprise any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of providing the functionality disclosed herein.

In one embodiment as shown in FIG. 2B, the policy management system 204 is operatively connected to the electronic computing device 106 and third party system 112 via network 202 to determine whether the electronic computing device 106 may generate the filter 120 (or whether the filter will contain the correct secure phrases). Similarly, in one embodiment, the policy management system 204 may be operatively connected to the electronic computing device 106 and encrypted data storage system 110 via network 202 to determine whether the electronic computing device 106 may encrypt the received data 104. Similarly, in one embodiment, the policy management system 204 may be operatively connected to the electronic computing device 106 and search management system 118 via network 202 to determine whether the electronic computing device 106 may generate the filter 120 (or whether the filter will contain the correct secure phrases). Generally, the policy management system 204 may use policies based on a user's role, identity, or location, the time of day the received data 104 is being created/received, the type of the received data 104 (e.g., email, patient medical record, social security number, etc.), etc. to determine whether to permit encryption or filter generation.

In one non-limiting example, the electronic computing device 106 may be any computing device used by an enterprise, the encrypted data storage system 110 may be an enterprise database, the search management system 118 may be a cloud-based system operated by the enterprise and/or an encryption company, the policy management system 204 may be a cloud-based system operated by the encryption company, and the third party system 112 may be a cloud-based system operated by the enterprise and/or encryption company. In this example, a user working for the enterprise may create a document that should be encrypted (e.g., a bank teller creates a request that includes routing information regarding a client's bank account, etc.). In one embodiment, the policy management system 204 may automatically identify the document as one that can only be stored in encrypted form. Thus, the policy management system 204 may prompt the electronic computing device 106 to automatically encrypt the document or prohibit the user from storing the document in unencrypted form. Further, if the policy management system 204 determines that a filter 120 should be created for the document, then the policy management system 204 may automatically prompt the electronic computing device to generate the filter 120. In an alternative embodiment, the policy management system 204 may apply one or more predefined rules to the actions taken by the electronic computing device 106 (e.g., limiting the number of filters created to a particular number per defined period of time, indicating the types of data for which filters should be generated, etc.). Thus, in one embodiment, the electronic computing device 106 may, based on those one or more predefined rules, encrypt data, generate filters, etc. In one embodiment, the one or more predefined rules may define parameters for an action(s) that is potentially abnormal (e.g., an unusually high number of requests for encryption or filter generation have occurred within the last hour, etc.) and cause an appropriate action to take place on the electronic computing device 106 in response thereto (e.g., automatically decline a request for encryption or filter generation, etc.).

Now referring to FIG. 2C, an exemplary architecture 200C of a cryptographically-secure query system with ranked indexes according to one embodiment of the present disclosure is shown. As shown, FIG. 2C is virtually identical to FIG. 2A, except that FIG. 2C relates to an alternative exemplary architecture 200C that also comprises a ranking system 206. Accordingly, except as discussed below, the discussion of FIG. 2A also applies to FIG. 2C. As will be understood and appreciated, the exemplary architectures shown in FIGS. 2A and 2C are provided for illustrative purposes only, and other architectures are possible within aspects of the present disclosure. Generally, the ranking system 206 may comprise any computing device (e.g., desktop computer, laptop, servers, tablets, etc.), combination of computing devices, software, hardware, combination of software and hardware, database (e.g., stored in the cloud or on premise, structured as relational, etc.), or combination of databases that is capable of providing the functionality disclosed herein. Further, the exemplary architecture 200C may also comprise (although not pictured in FIG. 2C) a policy management system 204 (from FIG. 2B).

In one embodiment, as shown in FIG. 2C, the ranking system 206 is operatively connected to the electronic computing device 106 via network 202 to store and manage a ranking scheme regarding the filters 120 (e.g., a rank index with secured/encrypted metadata regarding the filters 120) to provide a relevance of results to a particular query so that the results of that query may be ordered in accordance to their relevance. Generally, the electronic computing device, in addition to steps C1 to C4 (from FIG. 1), computes a rank record 208 relating to encrypted metadata regarding the data 104 (e.g., who created the data, how many times the data has been accessed, how many times a particular term appears within a document, how many times the data has been listed in query results, how many times the data has been opened from query results, etc.) and transmits that rank record 208 to the ranking system 206. In one embodiment, the rank record 208 comprises encrypted counters that track various components of the data (e.g., how many times the data has been listed in query results) and are continuously updated by the ranking system 206 as queries are conducted (in coordination with the encrypted data storage system 110 and the search management system 118) as the action that the counter tracks occurs (e.g., the counter is changed every time the data appears in query results—in one embodiment, the counter is set to 0 at creation of the data and is incremented by 1 every time the data appears in query results).

In various embodiments, the rank record 208 may be computed after (or concurrent with) the electronic computing device 106 receives the secured phrases 116 at step C3 and before (or concurrent with) the creation of the filters 120 at step C4. In one embodiment, the electronic computing device 106 splits the secured phrases 116 into sublists (e.g., in one embodiment, a list of a particular, fixed length, such as 256 bits, that contains secured phrases 116) and places each sublist in its own filter 120, with the secured phrases 116 sorted into each sublists based on one or more commonalities between the metadata of the secured phrases 116. Generally, each rank record 208 and its associated filters 120 and data 104 may be identified by its own unique, encrypted identifier such that the ranking system 206 cannot identify filters 120 and data 104 without the assistance of the search management system 118 and encrypted data storage system 110, respectively (and vice versa for the search management system 118 identifying data 104 and rank records 208 and the encrypted data storage system 110 identifying filters 120 and rank records 208).

Referring now to FIG. 2D, an exemplary architecture 200D of a cryptographically-secure query system according to one embodiment of the present disclosure is shown. In various embodiments, the cryptographically-secure query system comprises an electronic computing device 124, encrypted data storage system 110, third party system 112, and search management system 118 operatively connected via network 202. Generally, the electronic computing device 124 is any device that is capable of performing the functionality disclosed herein (e.g., desktop computer, laptop computer, tablet computer, smartphone, smartwatch, etc.). In various embodiments, the electronic computing device 124 communicates via network 202 with the encrypted data storage system 110, third party system 112, and search management system 118 to perform the cryptographically-secure query process. Further details of the cryptographically-secure query process will be discussed in association with the description of FIG. 4. Generally, network 202 may be a secure or unsecured connection, local area network, the internet, etc. Thus, the transmission to/from the electronic computing device 124, encrypted data storage system 110, third party system 112, and search management system 118 may be secure, encrypted, etc. In one embodiment, for security and/or efficiency purposes, the electronic computing device 124, encrypted data storage system 110, and/or search management system 118 may have a centralized architecture (e.g., instead of the distributed architecture shown in FIG. 2D). The electronic computing device 124 may be, in various embodiments, the same device as electronic computing device 106, from FIGS. 2A and 2B, or a different device. In one embodiment (not shown in FIG. 2D), the cryptographically-secure query system may further comprise the policy management system 204 to determine whether a particular user can initiate a particular query, view the results of a particular query, view certain results of a query, open certain results of a query, etc. Similarly, except as discussed herein, the discussion of FIGS. 2A, 2B, and 2C also applies to FIG. 2D.

Now referring to FIG. 2E, an exemplary architecture 200E of a cryptographically-secure query system with ranked indexes according to one embodiment of the present disclosure is shown. As shown, FIG. 2E is virtually identical to FIG. 2D, except that FIG. 2E relates to an alternative exemplary architecture 200E that also comprises a ranking system 206. Accordingly, except as discussed below, the discussion of FIG. 2D also applies to FIG. 2E. As will be understood and appreciated, the exemplary architectures shown in FIGS. 2D and 2E are provided for illustrative purposes only, and other architectures are possible within aspects of the present disclosure. For example, the exemplary architecture 200E may also comprise (although not pictured in FIG. 2E) the policy management system 204 (from FIG. 2B). Generally, the presence of the ranking system 206 permits the ranking and ordering of the results of a query so that the searcher 108 can view the most relevant results at the top of the list 130.

In various embodiments, after the electronic computing device 124 receives the list 130 of data items corresponding to the query from the search management system 118 at step S4 (from FIG. 1), the electronic computing device 124 computes a rank index 210 based on the received list 130 of data items identifying each of the data items on the received list 130 and, in one embodiment, identifying the appropriate metadata to provide regarding each identified data item. The electronic computing device 124, in one embodiment, then transmits the rank index 210 to the ranking system 206. The ranking system 206, in various embodiments, receives the rank index 210 and increments any relevant counters regarding each of the data items identified in the rank index 210 (e.g., the ranking system 206 may increase the count of the counter indicating how many times a data item 104 has been returned in a results list 130). In one embodiment, the ranking system 206 must decrypt or unmask the information contained within the rank index 210 so that it may determine the appropriate action to take with respect to the same.

The ranking system 206, in various embodiments, retrieves the relevant metadata 212 regarding each of the data items identified in the rank index 210 and provides that metadata 212 (e.g., data created, number of times viewed, number of times a particular term appears within the data) back to the electronic computing device 124. In various embodiments, the electronic computing device 124 receives the metadata 212 and sorts the received list 130 of data items corresponding to the query according to the received metadata 212 (e.g., to order the list 130 according to a date created for each of the data items, the number of times a query term appears in a data item, how many times the data items have been accessed, etc.). In one embodiment, the electronic computing device 124 must decrypt or unmask the information contained within the metadata 212 so that it may determine the appropriate action to take with respect to the same. In various embodiments, after ordering the received list 130 according to the metadata 212, the electronic computing device 124 displays the ordered list 130 to the searcher 108 so that the searcher 108 may select the data items that he/she wishes to retrieve from the encrypted data storage system 110 (e.g., at step S5 from FIG. 1).

Now referring to FIG. 3 (consisting of FIGS. 3A, 3B, and 3C), exemplary secure-filter generation processes are shown according to one embodiment of the present disclosure. Generally, the secure-filter generation process is the process by which filters (such as filter 120 from FIG. 1) are created for subsequent querying. FIG. 3A illustrates an exemplary secure-filter generation process 300A according to one embodiment of the present disclosure. FIG. 3B illustrates an alternative secure-filter generation process 300B according to one embodiment of the present disclosure. FIG. 3C illustrates an alternative secure-filter generation process 300C with ranked indexes according to one embodiment of the present disclosure. As will be understood by one having ordinary skill in the art, the steps and processes shown in FIG. 3 (and those of all other sequence diagrams and flowcharts shown and described herein) may operate concurrently and continuously, are generally asynchronous and independent, and are not necessarily performed in the order shown. Generally, the steps and process shown in FIG. 3 (and those of all other sequence diagrams and flowcharts shown and described herein) may occur automatically without the intervention of a user.

Referring now to FIG. 3A, in various embodiments, the secure-filter generation process 300A begins at step 302 when an electronic computing device receives data (e.g., data 104 from FIG. 1) from a user (e.g., creator 102 from FIG. 1) as part of generation of that data (e.g., the user creates a document) or from some other system or instruction. In one embodiment, the user may not enter data into the electronic computing device but may instead select data (e.g., existing files, etc.) for which the secure-filter generation process will occur as, for example, part of a bulk import. Examples of data include (but are not limited to) text files, audio files, video files, data files, system files, image files, or any form of digital data comprising emails, electronic documents, online messages, social media posts, web-based forms, etc., or any variant, sub-part, portion, or combination thereof. In various embodiments, at step 304, the data may be encrypted, by the electronic computing device 106 or another system. Generally, this disclosure should be understood to place no restrictions on the method of encryption (e.g., encryption at rest, encryption in motion, etc.) or cryptographic algorithm used to perform the same (e.g., AES, RSA, etc.). After encrypting the data, in one embodiment, the electronic computing device 108 stores the encrypted data in the encrypted data storage system 110 at step 306. Thus, at step 308, in one embodiment, the encrypted data storage system 110 provides the electronic computing device 108 with a file path or other storage location identifier so that the electronic computing device 106 may locate the encrypted data corresponding to the received data at a later date/time. In various embodiments, steps 306 and 308 may not occur at all because the data may not be encrypted.

At step 310, the electronic computing device 106, in one embodiment, may temporarily retain an unencrypted copy of the data and preprocess the data to make querying the data more efficient and effective by generating a list of discrete phrases contained within the data. Generally, the phrases may be, but are not limited to, specific words (e.g., "dog"), combination of letters (e.g., "do"), a combination of words and/or letters, etc. In one embodiment, the data is processed according to certain predefined rules to make the queries more efficient and secure by flagging as low-priority or removing redundant phrases, flagging as low-priority or removing commonly-used phrases (e.g., "the"), normalizing the data, stemming the data, etc. In one embodiment, the electronic computing device 106 may tag each phrase with contextual information/metadata regarding the phrase (e.g., a column header, a data field, a data identifier, page number, paragraph number, etc.) so that the subsequent queries can be narrowly tailored (e.g., a user may search for "DOG" on page 1, in the first column of a file, as the pet type, etc.). For example, in one non-limiting embodiment, if "DOG" is in the first column of a spreadsheet, then the electronic computing device 106 would tag "DOG" with "column1" to generate the phrase "column1_DOG" at step 310 that will be masked, secured, and extracted before being placed into the filter. Thus, when a subsequent user wishes to query for "DOG" in column 1, the phrase that would form the basis of the query would be "column1_DOG" and could be manually generated by a user with an understanding of the tagging nomenclature or automatically generated by the electronic computing device 124 based upon the inputs of the user (further details of the cryptographically-secure query process will be discussed in association with the description of FIG. 4).

In one embodiment, at step 312, the electronic computing device 106 masks each of the discrete phrases using an algorithm so that the third party system 112 cannot determine the original phrases (e.g., for each searchable phrase p, the electronic computing device 106 chooses a random $r_p$ and computes $c_p = (r_p)^e \text{Hash}(p) \pmod{N}$ for some unsecure hash function or secure, NIST-approved hash function such as SHA-256, RIPEMD-160, BLAKE 2, etc.).

In various embodiments, at step 314, the electronic computing device 106 transmits the masked phrases (e.g., the computed values of $c_p$) to the third party system 112 for further processing. At step 320, in one embodiment, the third party system 112 receives and secures the masked phrases using an algorithm and a cryptographic key that is only known to the third party (e.g., for each $c_p$, the third party system 112 computes $s_p = (c_p)^d \pmod{N}$, wherein $x^{e*d} = x$ and d is the cryptographic key). Accordingly, no system, user, or party will be able to access the secured versions of the phrases without access to the cryptographic key. At step 322, in various embodiments, the third party system 112 transmits the secured versions of the phrases (e.g., the computed values of $s_p$) back to the electronic computing device 106 for creation of a filter(s). In various embodiments, at step 324, the electronic computing device 106 receives and extracts the secured phrases using an algorithm (e.g., for each $s_p$, the electronic computing device 106 computes $(r_p)^{-1}$ and $h_p = (r_p)^{-1} s_p \pmod{N}$). In one embodiment, steps 312 through 324 comprise a schema similar to Chaum's Blind Signature Scheme (previously referenced herein).

In various embodiments, at step 326, the electronic computing device 106 generates one or more filters based on the extracted secured phrases (e.g., the computed values of $h_p$). At step 328, in one embodiment, the electronic computing device 106 transmits the filters to the search management system 118, where the filters are stored for use in subsequent secure querying of the data (received at step 302). In one embodiment, the electronic computing device 106 transmits contextual data regarding the received data (e.g., a user identifier associated with a user entering the received data, a user identifier of a user interacting with the received data, a session identifier, a time instant at which the received data was generated, a time instant at which the received data was accessed, an electronic device identifier, an application program identifier, an enterprise identifier, a network address) along with the filters to the search management system 118 for subsequent tracking of the filters, mapping the filters to their corresponding received data, etc. In one embodiment, not shown in FIG. 3A, the electronic computing device 106 transmits the extracted secured phrases to the search management system 118 or a representation of the extracted secured phrases, and the search management system 118 creates the filter based on the extracted secured phrases and stores the filter for use in subsequent secure querying of the data and the secure-filter generation process 300A ends thereafter.

Still referring to FIG. 3A, in one embodiment, an elliptic curve oblivious pseudorandom function ("EC-OPRF") based on hashing integers to points on an elliptic curve over a finite field and computing the blinded multiples of each point may be employed at steps 312, 314, 320, 322, and 324 instead of the previously-described computations (that use a schema similar to Chaum's Blind Signature Scheme) to mask, secure, and prepare the phrases for insertion into the filters, as follows. As will occur to one having ordinary skill in the art, the use of EC-OPRF for these steps enables creation of the filters such that neither the electronic computing device 106 nor the third party system 112 may independently determine the terms within the filter 120.

In various embodiments, to prepare for use of EC-OPRF, at step 312, the electronic computing device 106 masks each of the discrete phrases by hashing each of the preprocessed phrases along a non-singular elliptic curve using an NIST-approved hash function, wherein each phrase is mapped to a point along the curve (further details of which are discussed in, for example, Thomas Icart, *How to Hash into Elliptic Curves*, in 5677 Lecture Notes in Computer Science (Advances in Cryptology—CRYPTO 2009) 303 (2009), the disclosure of which is incorporated by reference herein), and then computing the scalar multiplication of a random integer with the hashed phrases. In various embodiments, at step 314, the electronic computing device 106 transmits the masked phrases to the third party system 112 for further processing. At step 320, in one embodiment, the third party system 112 receives and secures the masked phrases by computing the scalar multiplication of each of the hashed phrases with a random integer that is only known to the third party system. At step 322, in various embodiments, the third party system 112 transmits the secured versions of the phrases back to the electronic computing device 106. In various embodiments, at step 324, the electronic computing device 106 receives and extracts the secured phrases using an algorithm (e.g., multiplying the secured query term by the multiplicative inverse of the computations used to mask the query term from step 406, etc.) and then applies a pseudo-random function based on the elliptic curve to the extracted secured phrases to ensure that neither the electronic computing device 106 nor the third party system 112 may independently determine the discrete phrases.

Referring now to FIG. 3B, an alternative exemplary secure-filter generation process 300B according to one embodiment of the present disclosure is shown. As shown, FIG. 3B is virtually identical to FIG. 3A, except that FIG. 3B relates to an alternative exemplary secure-filter generation process 300B that also comprises steps 316 and 318. Accordingly, except as discussed below, the discussion of FIG. 3A also applies to FIG. 3B. As will be understood and appreciated, the exemplary processes shown in FIGS. 3A and 3B are provided for illustrative purposes only, and other processes are possible within aspects of the present disclosure. Generally, at step 314, the electronic computing device transmits the masked phrases to the policy management system 204 along with a request for determination of whether the user is authorized to generate the filter. At step 316, in one embodiment, the policy management system 204 receives the masked phrases and compares the request to one or more predefined policies that indicate whether a particular user is authorized to complete a particular action (e.g., generate a filter, encrypt received data, generate a query, etc.) based on the particular user's identity, device, location, etc. If the policy management system 204 determines that the user is authorized to generate the filter, then, in one embodiment at step 318, the policy management system 204 transmits the masked phrases to the third party system 112 for completion of step 320 and the rest of the secure-filter generation process 300B. If the policy management system 204 determines that the creator is not authorized to generate the filter, then, in one embodiment, the policy management system 204 transmits an error message to electronic computing device 106 and/or prevents the action from occurring. In one alternative embodiment (not shown in FIG. 3B), as part of step 318, the policy management system 204 may certify the request to generate the filter and transmit the certified request back to the electronic computing device 106, wherein the electronic computing device 106 transmits the certified request to the third party system 112. In one embodiment, the policy management system 204 may determine, as part of steps 304-308, whether the electronic computing device 106 may encrypt the received data. Similarly, in one embodiment, the policy management system 204 may determine, as part of steps 326 and 328, whether the electronic computing device 106 may generate the filter.

Now referring to FIG. 3C, an alternative exemplary secure-filter generation process 300C with ranked indexes according to one embodiment of the present disclosure is shown. As shown, FIG. 3C is virtually identical to FIG. 3A, except that FIG. 3C relates to an alternative exemplary secure-filter generation process 300C with rank indexes that also comprises steps 330 and 332. Accordingly, except as discussed below, the discussion of FIG. 3A also applies to FIG. 3C. As will be understood and appreciated, the exemplary processes shown in FIGS. 3A, 3B, and 3C are provided for illustrative purposes only, and other processes are possible within aspects of the present disclosure. In one embodiment, at step 326, the electronic computing device 106, prior to generating one or more filters, splits the extracted secured phrases into sublists (e.g., in one embodiment, a list of a particular, fixed length, such as 256 bits, that contains secured phrases) based on one or more predefined rules, assigns an identifier to each sublist (the identifier may or may not be encrypted, masked, or secured in some manner) that may be stored in association with the filter in the search management system, and generates one filter for each sublist based on the sublist itself, which is transmitted to the search management system 118 at step 328. In one embodiment, the electronic computing device 106 may pad each of the sublists with random values such that not all of the data within the sublist represents data in the original data. At step 330, in various embodiments, the electronic computing device 106 computes a rank record for each sublist based on the sublist itself and the identifier for the sublist, wherein the rank record comprises metadata regarding the original data received by the electronic computing device (e.g., date/time created, author, author's role, document type, creating program, number of times a phrase appears within the data, number of times the data has appeared in query results, number of times the data has been opened from query results, most recent date of opening, most recent date of editing, etc.). In one embodiment, the rank record is encrypted, masked, or secured such that the ranking system 206 cannot determine the data that it contains. Generally, both the information within the rank record and the filter may be encrypted such that the foreign keys for each (e.g., the identifier that indicates which filter corresponds to which rank record) cannot be directly correlated without further computation. In various embodiments, at step 332, the electronic computing device 106 transmits the rank record to the ranking system 206.

Referring now to FIG. 4 (consisting of FIGS. 4A and 4B), exemplary cryptographically-secure query processes are shown according to one embodiment of the present disclosure. Generally, the cryptographically-secure query process permits a search for one or more phrases in a given set of data (e.g., document files, social media posts, etc. that have already undergone the secure-filter generation process from FIG. 3). FIG. 4A illustrates an exemplary cryptographically-secure query process 400A according to one embodiment of the present disclosure. FIG. 4B illustrates an alternative exemplary cryptographically-secure query process 400A with ranked indexes according to one embodiment of the present disclosure.

Now referring to FIG. 4A, an exemplary cryptographically-secure query process 400A is shown according to one embodiment of the present disclosure. Generally, the cryptographically-secure query process 400A permits a user to search for one or more phrases in a given set of data (e.g., document files, social media posts, etc. that have already undergone the secure-filter generation process). Thus, 400A is the process by which query terms (such as query term 122 from FIG. 1) are compared against filters (such as filter 120 from FIG. 1) to determine whether the query terms are present in a particular set of data (such as data 104 from FIG. 1).

In various embodiments, the cryptographically-secure query process 400A generally commences, at step 402, when the electronic computing device 124 receives one or more query terms (such as query terms 122 from FIG. 1) from a user (such as searcher 108 from FIG. 1). Generally, the user may enter any query terms via multiple inputs, including but not limited to the native search functionality of an application, program, or operating system, a specific-created secure search program or application, a ghosted search box within an application or program (e.g., a search box that appears to be the native search box but actually corresponds to the secure search), etc. At step 404, in various embodiments, the electronic computing device 124 preprocesses the query term to make the query more efficient and effective by generating a list of the query terms. In one embodiment, the query term is processed according to certain predefined rules to make the queries more efficient and secure by removing redundant phrases, removing commonly-used phrases (e.g., "the"), normalizing the query term, stemming the query term, etc. In one embodiment, at step 406, the electronic computing device 124 masks each of the query terms using an algorithm so that the third party system 112 cannot determine the original query terms (e.g., for each query term t, the electronic computing device 106 chooses a random $r_t$ and computes $c_t=(r_t)^e \text{Hash}(t)(\text{mod } N)$ for some secure, NIST-approved hash function; in one embodiment, e, d, and the hash function used in steps 406 through 414 are the same as those used in steps 312 through 324, from FIG. 3).

At step 408, in various embodiments, the electronic computing device 124 transmits the masked query terms (e.g., the computed values of $c_t$) to the third party system 112 for further processing. The third party system 112 receives and secures the masked query terms 126, at step 410 in various embodiments, using an algorithm and a cryptographic key that is only known to the third party (e.g., for each $c_t$, the third party system 112 computes $s_t=(c_t)^d(\text{mod } N)$, wherein $x^{e*d}=x$ and d is the cryptographic key). Accordingly, no system, user, or party will be able to access the secured versions of the query terms without access to the cryptographic key. In one embodiment, the cryptographic key used in step 410 is the same as the cryptographic key used in step 320 (from FIG. 3). Generally, the cryptographic key may be that used by a cryptographic algorithm (e.g., RSA, etc.), a crypto-variable, a "secret" that is known by the third party system 112, etc. In one embodiment at step 412, the third party system 112 transmits the secured versions of the query terms (e.g., the computed values of $s_t$) back to the electronic computing device 124 for querying the one or more filters. At step 414 in various embodiments, the electronic computing device 124 receives and extracts the secured versions of the query terms using an algorithm (e.g., for each $s_t$, the electronic computing device 106 computes $(r_t)^{-1}$ and $h_t=(r_t)^{-1}s_t(\text{mod } N))$. In one embodiment, steps 406-414 comprise a schema similar to Chaum's Blind Signature Scheme (previously referenced herein).

In one embodiment, an elliptic curve oblivious pseudorandom function ("EC-OPRF") based on hashing integers to points on an elliptic curve over a finite field and computing the blinded multiples of each point may be employed at steps 406, 408, 410, 412, and 414 instead of the previously-described computations (that use a schema similar to Chaum's Blind Signature Scheme) to mask, secure, and extract the query terms, as follows. In various embodiments, to prepare for use of EC-OPRF, at step 406, the electronic computing device 124 masks each of the query terms by hashing each of the query terms along a non-singular elliptic curve using an NIST-approved hash function, wherein each phrase is mapped to a point along the curve (further details of which are discussed in, for example, Thomas Icart, *How to Hash into Elliptic Curves*, previously referenced herein), and then computing the scalar multiplication of a random integer with the hashed phrases. In various embodiments, at step 408, the electronic computing device 124 transmits the masked query terms to the third party system 112 for further processing. At step 410, in one embodiment, the third party system 112 receives and secures the query terms by computing the scalar multiplication of each of the hashed phrases with a random integer that is only known to the third party system. At step 412, in various embodiments, the third party system 112 transmits the secured versions of the query terms back to the electronic computing device 124. In various embodiments, at step 414, the electronic computing device 124 receives and extracts the secured query terms using an algorithm (e.g., multiplying the secured query term by the multiplicative inverse of the computations used to mask the query term from step 406, etc.) and then (in one embodiment, at step 416) applies a pseudorandom function based on the elliptic curve to the extracted secured query terms to generate the query.

Still referring to FIG. 4A, in one embodiment at step 416, the electronic computing device 124 creates a query based on the extracted versions of the query terms (e.g., the computed values of $h_t$) and transmits that query to a search management system 118 at step 418. In one embodiment, the query comprises a request to run the extracted versions of the query terms against the filters and includes the extracted versions of the query terms along with an indication of the particular set of filters against which they should be compared. In various embodiments at step 420, the search management system 118 compares the query against the one or more filters to determine which data items may contain the query terms (from step 402) and compiles a list of those data items that contain the query terms. For example, the search management system 118 tests a particular filter to determine whether it may contain the query term (e.g., runs the extracted version of the query term through the filter to receive a positive or negative response from the filter, compares the value of the extracted version of the query term to the values in the filter to determine a match, etc.). If a particular filter contains the query term, then an entry for that filter is included on the list (e.g., a table of results wherein each row corresponds to a different result and comprises the unique universal identifier of the filter, file path of the document to which the filter corresponds, etc.)

At step 422, in one embodiment, the search management system 118 transmits the list of results to the electronic computing device 124. Generally, in one embodiment, the list may be filtered so that the user of the electronic computing device 124 is only aware of those results that the user will be able to access. In one embodiment at step 424, the electronic computing device 124 receives and transmits that list to the encrypted data storage system 110 as a request to retrieve the data items on the list. Alternatively, instead of steps 422 and 424, at step 426 in one embodiment, the search management system 118 transmits the list to the encrypted data storage system 110 as a request to retrieve the data items on the list. Thus, at step 428 in various embodiments, the encrypted data storage system 110 receives the request and retrieves those data items corresponding to the request. In various embodiments, at step 430 the encrypted data storage system 110 transmits the retrieved data items back to the electronic computing device 124. At step 432 in various embodiments, the electronic computing device 124 receives and decrypts the data items so that decrypted versions of the data items may be accessed on the electronic computing device 124. In one embodiment, the decrypted versions of the data items may correspond to the data entered as part of the secure-filter generation process (at step 302 from FIG. 3). In one embodiment, the encrypted data storage system 110 decrypts the data items and transmits them to the electronic computing device 124 as part of step 428. In various embodiments, at step 428, the electronic computing device 124 may post filter the decrypted results using the plaintext query terms to remove any results that do not contain the query terms (e.g., false positives, etc.). Generally, the cryptographically-secure query process 400A ends thereafter.

Referring now to FIG. 4B, an alternative exemplary cryptographically-secure query process 400A with ranked indexes according to one embodiment of the present disclosure according to one embodiment of the present disclosure is shown. As shown, FIG. 4B is virtually identical to FIG. 4A, except that FIG. 4B relates to an alternative exemplary cryptographically-secure query process 400A with ranked indexes according to one embodiment of the present disclosure that also comprises steps 434-442. Accordingly, except as discussed below, the discussion of FIG. 4A also applies to FIG. 4B. As will be understood and appreciated, the exemplary processes shown in FIGS. 4A and 4B are provided for illustrative purposes only, and other processes are possible within aspects of the present disclosure. In one embodiment, at step 434, the electronic computing device 124 computes a rank index for each of the query results (returned at step 422) comprising the identifier for the sublist corresponding to the particular query result and a list of the one or more items of metadata with which the electronic computing device 124 will rank/order the query results. In one embodiment, the rank index is encrypted, masked, or secured such that the ranking system 206 must further process the rank index to determine the data that it contains. Generally, the electronic computing device 124 transmits the rank index to the ranking system 206 at step 436. The ranking system 206, in various embodiments, at step 438, determines the appropriate rank records corresponding to the identifiers within the received rank index (e.g., in one embodiment, the ranking system 206 decrypts the rank index to make this determination), increments any relevant counters regarding those rank records (e.g., number of times the rank record has appeared in query results, etc.), and retrieves the metadata from those rank records corresponding to the requested metadata. The ranking system 206, generally, returns the retrieved metadata to the electronic computing device 124 at step 440. In one embodiment, the retrieved metadata is encrypted, masked, or secured such that the electronic computing device 124 must further process the retrieved metadata to determine the data that it represents (e.g., using a key stored in association with the filter to which the metadata applies). The electronic computing device 124, in various embodiments, at step 442, processes the received metadata (e.g., decrypting the metadata so that it is in a usable format) and orders/ranks the query results according to one or more predefined rules based on the received metadata. For example, the query results may be ordered by date last accessed, date last edited, number of times the query terms appear in a particular result, proximity between query terms within a particular result (or some other measure of relevance), number of times accessed, number of times returned in query results, author, etc. In one embodiment, the order of the query results may be changed at the request of the user (e.g., from ordered by date last accessed to number of times the query terms appear in a particular result, etc.).

In one embodiment, (not shown in FIG. 4B), steps 434-442 occur before steps 416-422 such that steps 434-442 may act as a pre-filter to the actual query (e.g., permitting the results to be limited to only those results authored by a particular individual, accessed within the last week, etc. Generally, in this embodiment, the results may or may not be ordered/ranked.

Now referring to FIG. 5 (consisting of FIGS. 5A and 5B), exemplary filter storage schemas of the disclosed system are shown. FIG. 5A illustrates an exemplary filter table 500A according to one embodiment of the present disclosure. FIG. 5B illustrates an exemplary FiG tree 500B according to one embodiment of the present disclosure. As will be understood by one having ordinary skill in the art, any filter storage schema may be used with the presently disclosed systems and methods, and the storage schemas discussed in FIG. 5 are for non-limiting, exemplary purposes only. In various embodiments, data within the search management system 118 may be stored in any linear data structure (e.g., record, array, etc.) or nonlinear data structure (e.g., filter-gradient tree, HiiT, inverted index, multidimensional filter, etc.). Generally, if the data within the search management system 118 is static (e.g., it will not change frequently), then the data may be stored in a filter-gradient tree, such as the FiG tree 500B. Alternatively, if the data within the search management system 118 will be constantly changing, then the data may be stored in a HiiT or a linear data structure, such as the filter table 500A, as the structure of the HiiT or filter table 500A may be easily updated.

Referring now to FIG. 5A, an exemplary filter table 500A is shown displaying exemplary attributes associated with filters and stored in an exemplary search management system 118. The exemplary filter table 500A is one non-limiting example of how filters may be stored in the search management system 118 and what data is stored in association with each filter. As shown, in one embodiment, the filter table 500A comprises attributes named Entity 502, Reference Location 504, Filter 506, Keytag 508, and Application 510. All of this information may comprise contextual information regarding the filter that is utilized in querying the filters. For example, in one embodiment, the Entity 502 uniquely identifies a particular set of users associated with the search management system 118 so that the search management system 118 only queries those filters that are relevant to a particular user. Similarly, the Application 510 identifies the particular program/application from which the original data (on which the filter is based) was generated so that the search management system 118 only queries those filters that are relevant to a particular user. In one embodiment, the Reference Location 504 identifies file path or other storage location identifier so that the user may easily retrieve the search results identified by the search management system 118. The Filter 506, in one embodiment, comprises the filter against which the search management system 118 queries to determine whether a particular item is present in the original data on which the filter is based.

Now referring to FIG. 5B, an exemplary FiG tree 500B is shown displaying exemplary filters 506 and 512 stored at each node 514 and 516 of the FiG tree 500B. In one embodiment, a filter gradient is a triple comprising an index, a set membership filter, and an ordered genealogy, and a FiG tree is a rooted tree with filter gradients as nodes. In various embodiments, the FiG tree 500B comprises a storage schema for filters in the form of a tree of keyed set membership filters, wherein each node 514 and 516 of the FiG tree 500B comprises a unique filter 506 and 512. The FiG tree 500B is generally constructed such that querying a particular node 514*a* for a particular query term (e.g., "CAT") will indicate whether a particular node 514*b* or 514*c* underneath it in the FiG tree 500B comprises that term. For example, if searching for the term "CAT" in the FiG tree 500B, a query of the node 514*a* would indicate that at least one node 514*b* or 514*c* beneath it may comprise the search term. Continuing with this example, the search would continue with a query of both nodes 514*b* and 514*c*, which would indicate that only the nodes/leaves 516 beneath node 514*b* may comprise the search term. Thus, the search would continue until leaf 516*a* is determined to be the only leaf 516 that may comprise the search term "CAT."

Generally, the FiG tree 500B requires relatively small amounts of storage (in comparison to a standard table, such as exemplary filter table 500A from FIG. 5A) by requiring smaller filters to result in the same rate of false positives (alternatively, FiG tree 500B may reduce the rate of false positives through use of multiple filters of the same size as those in the exemplary filter table 500A from FIG. 5A, but the size of the FiG tree 500B would likely be larger than that of the exemplary filter table 500A) and promotes faster querying because the queries are probabilistic and terminate sublinearly when not every node 514 and 516 of the FiG tree 500B needs to be searched for a query term (e.g., as discussed in the previous example, wherein only five of the seven nodes 514 and 516 are searched to find the search term "CAT").

In various embodiments, the FiG tree 500B is constructed by a device that has access to the plaintext of the documents that are stored within the search management system 118 (e.g., when the FiG tree 500B comprises a filter-gradient tree). For example, in one embodiment, the FiG tree 500B may be constructed by the electronic computing device 106 (from FIG. 1) of the creator 102 who created the document. In an alternative embodiment, the FiG tree 500B is constructed by the encrypted data storage system 110 (from FIG. 1) or the search management system 118. In another embodiment, the FiG tree 500B is created by another entity that is not any of the electronic computing device 106, encrypted data storage system 110, or the search management system 118. In various embodiments, the FiG tree 500B comprises one or more FiG filters 512 that are specifically constructed to indicate the content of the nodes 514 and leaves 516 beneath that particular FiG filter 512. Generally, at the bottom of the tree are the leaves 516 that comprise the filters 506 that are constructed in accordance with the present disclosure to securely represent a particular item of data 104 (as discussed in association with the description of FIG. 1) or a portion/subset of the same. In one embodiment, the FiG tree 500B may be padded with random entries (e.g., by inserting filters that do not represent any actual data into empty nodes 512 or leaves 516) such that it contains the maximum number of items at each depth of the tree (e.g., no node 512 is missing any leaves 516) thereby obscuring the true size of the FiG tree 500B. In one embodiment, the FiG tree 500B may not contain the maximum number of items at each depth of the tree.

Referring now to FIG. 6 (consisting of FIGS. 6A and 6B), screenshots 600A and 600B respectively of exemplary query of encrypted data are shown. In one non-limiting example, FIG. 6 displays screens with which a user would interact while completing a cryptographically-secure query, using the systems and methods disclosed herein, of encrypted files stored in association with a social media platform. Thus, the user could be looking for a particular post, message, file, etc. that the user shared/created on the social media platform in encrypted form. Specifically, FIG. 6A corresponds to a user conducting an unencrypted search of encrypted data and FIG. 6B displays exemplary screenshot 600B that corresponds to an instance after conducting a search of the encrypted data that shows exemplary search results.

The user begins by entering cleartext search terms 602 (e.g., "DOG") inside text-search box 604, and then clicking on the "Search" button 606 (corresponding to steps 402 and 404 from FIG. 4). In one embodiment of the present disclosure, the system modifies native buttons, boxes, and other user-interface controls/features of the third party application software program. Next, the system conducts the search of the filters using the secured query (corresponding to steps 406-422 from FIG. 4) and returns search results 608 and 610 (FIG. 6B) to the user, ranking/ordering the results 608 and 610 as appropriate and post-processing the results 608 and 610 as would be consistent with the third party application software program (e.g., term highlighting of cleartext terms, etc.) (corresponding to steps 424-432 from FIG. 4). Generally, if the user has the authority to view the search result, then the search result 608 will appear in clear text; whereas, if the user does not have the authority to view the search result, then the search result 610 will appear in encrypted form. In one embodiment, the system does not return search results that the user does not have the authority to view (e.g., those unauthorized search results, such as search result 610, are not included in the search results list).

It will be generally understood that the screenshots provided herein are for illustrative purposes only. Embodiments of the present systems and methods have broader applicability in that such embodiments can be integrated with any third party application software program. In other words, embodiments of the present systems and methods are agnostic of the user's application software (e.g., web browser, email software, document software, spreadsheet software, multimedia software, etc.), the operating system/platform on which the program is operating, or even the user's computing device.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A method, comprising the steps of:
receiving a search request at an electronic computing device, the search request comprising one or more phrases to be searched against a plurality of filters representing a plurality of data items stored in a search system;
transforming each of the one or more phrases according to a first predetermined algorithm to generate a masked version of each of the one or more phrases;
transmitting the masked version of each of the one or more phrases to a third party system for securing the masked version of each of the one or more phrases;
receiving, at the electronic computing device, a secured version of the one or more phrases from the third party system;
transforming the received secured version of the one or more phrases according to a second predetermined algorithm to generate query data; and
transmitting the query data to the search system, wherein the search system runs the query data through the plurality of filters to identify one or more data items corresponding to the search request.

2. The method of claim 1, further comprising the steps of:
receiving, at the electronic computing device, a list of references to the one or more data items corresponding to the search request from the search system; and
accessing, based on the list of references to the one or more data items corresponding to the search request, the one or more data items corresponding to the search request.

3. The method of claim 2, wherein the step of accessing further comprises decrypting the one or more data items corresponding to the search request.

4. The method of claim 1, further comprising the step of preprocessing the search request prior to transforming each of the one or more phrases according to predefined rules for removal of redundant phrases from, removal of commonly-used phrases from, and/or stemming of the plurality of phrases.

5. The method of claim 1, wherein the search system, to run the query data through the plurality of filters, identifies contextual data corresponding to the one or more data items corresponding to the search request.

6. The method of claim 1, wherein the one or more phrases are cleartext and the plurality of data items are ciphertext.

7. The method of claim 1, wherein the search system, to run the query data through the plurality of filters, performs a set membership check of each of the plurality of filters based on the query data.

8. A system, comprising:
an electronic computing device that receives a search request comprising one or more phrases to be searched against a plurality of filters representing one or more data items, wherein the electronic computing device transforms each of the one or more phrases according to a first predetermined algorithm to generate a masked version of each of the one or more phrases and transmits the masked version of each of the one or more phrases to a third party system;
the third party system that receives the masked version of each of the one or more phrases from the electronic computing device, wherein the third party system transforms the masked version of each of the one or more phrases according to a predetermined cryptographic algorithm to generate a secured version of the one or more phrases and transmits the secured version of the one or more phrases back to the electronic computing device;
the electronic computing device that receives the secured version of the one or more phrases from the third party system, wherein the electronic computing device transforms the received secured version of the one or more phrases according to a second predetermined algorithm to generate query data and transmits the query data to a search system; and
the search system that receives the query data, wherein the search system runs the query data through the plurality of filters to identify one or more data items corresponding to the search request.

9. The system of claim 8, wherein the search system determines a list of references to the one or more data items corresponding to the search request and transmits the list of references to the one or more data items corresponding to the search request back to the electronic computing device; and
the electronic computing device that receives the list of references to the one or more data items corresponding to the search request from the search system, wherein the electronic computing device accesses the one or more data items corresponding to the search request based on the list of references to the one or more data items corresponding to the search request.

10. The system of claim 9, wherein the electronic computing device decrypts the one or more data items corresponding to the search request as part of accessing the one or more data items corresponding to the search request.

11. The system of claim 8, wherein the electronic computing device preprocesses the search request prior to transforming each of the one or more phrases according to predefined rules for removal of redundant phrases from, removal of commonly-used phrases from, and/or stemming of the plurality of phrases.

12. The system of claim 8, wherein the search system, to run the query data through the plurality of filters, identifies contextual data corresponding to the one or more data items corresponding to the search request.

13. The system of claim 8, wherein the third party system transforms the masked version of each of the one or more phrases using a cryptographic key and the electronic computing device has no access to or knowledge of the cryptographic key.

14. The system of claim 8, wherein the search system, to run the query data through the plurality of filters, performs a set membership check of each of the plurality of filters based on the query data.

* * * * *